US012747893B2

(12) United States Patent
Sato et al.

(10) Patent No.: US 12,747,893 B2
(45) Date of Patent: Sep. 29, 2026

(54) HEAT GENERATION CELL, HEAT GENERATION DEVICE, AND HEAT UTILIZATION SYSTEM

(71) Applicant: CLEAN PLANET INC., Tokyo (JP)

(72) Inventors: Ryoki Sato, Tokyo (JP); Yasuhiro Iwamura, Miyagi (JP); Takehiko Ito, Tokyo (JP); Hideki Yoshino, Tokyo (JP)

(73) Assignee: CLEAN PLANET INC., Tokyo (JP)

( * ) Notice: Subject to any disclaimer, the term of this patent is extended or adjusted under 35 U.S.C. 154(b) by 381 days.

(21) Appl. No.: 18/559,517

(22) PCT Filed: Apr. 26, 2022

(86) PCT No.: PCT/JP2022/018982
§ 371 (c)(1),
(2) Date: Nov. 7, 2023

(87) PCT Pub. No.: WO2022/234800
PCT Pub. Date: Nov. 10, 2022

(65) Prior Publication Data
US 2024/0240836 A1 Jul. 18, 2024

(30) Foreign Application Priority Data
May 7, 2021 (JP) ................................ 2021-079384

(51) Int. Cl.
*F24V 30/00* (2018.01)
*F28F 9/22* (2006.01)
*H05B 3/46* (2006.01)

(52) U.S. Cl.
CPC ................ *F24V 30/00* (2018.05); *F28F 9/22* (2013.01); *H05B 3/46* (2013.01)

(58) Field of Classification Search
CPC ............... F24V 30/00; F28F 9/22; H05B 3/46
(Continued)

(56) References Cited

U.S. PATENT DOCUMENTS 5,113,928 A * 5/1992 Myers ........................ F28F 9/22 165/103
5,544,700 A * 8/1996 Shagoury .................. F02C 7/14 165/161
(Continued)

FOREIGN PATENT DOCUMENTS

JP S55014905 U 1/1980
JP S56100276 A 8/1981
(Continued)

OTHER PUBLICATIONS

Notice of Reasons for Refusal issued in Japanese Patent Application No. 2021-079384, mailed Jun. 17, 2025 (9 pages).
(Continued)

*Primary Examiner* — Avinash A Savani
(74) *Attorney, Agent, or Firm* — Osha Bergman Watanabe & Burton LLP

(57) ABSTRACT

A heat generating cell includes: a support having tubular shape; and a multilayer film formed on an inner peripheral surface of the support for generating heat by occlusion and discharge of hydrogen. A heat generating device includes: a plurality of the heat generating cells; a sealed container; a plurality of separators dividing an inside of the sealed container into a first space, a second space, and a third space in an axial direction of the sealed container, the first space and the second space being locating at both ends in the axial direction in the sealed container; and a heater for heating each of the plurality of heat generating cells. The plurality of heat generating cells penetrate through the plurality of separators, and both ends of each of the plurality of heat generating cells in an axial direction are respectively opened to the first space and the second space.

6 Claims, 13 Drawing Sheets

(58) Field of Classification Search
USPC .................................................... 126/263.01
See application file for complete search history.

(56) References Cited

U.S. PATENT DOCUMENTS

| | | | | |
|---|---|---|---|---|
| 2004/0231823 A1* | 11/2004 | Tsuji | ....................... | F25B 17/12<br>165/4 |
| 2014/0110004 A1* | 4/2014 | Westmeier | ............. | B32B 27/34<br>118/500 |

FOREIGN PATENT DOCUMENTS

| | | | |
|---|---|---|---|
| JP | S58022854 | A | 2/1983 |
| JP | S62196500 | A | 8/1987 |
| JP | H02243998 | A | 9/1990 |
| JP | H05045467 | U | 6/1993 |
| JP | H05157420 | A | 6/1993 |
| JP | H06006961 | U | 1/1994 |
| JP | 2000220921 | A | 8/2000 |
| JP | 6749035 | B1 | 9/2020 |
| WO | 2020122098 | A1 | 6/2020 |
| WO | 2021079489 | A1 | 4/2021 |

OTHER PUBLICATIONS

International Search Report issued in corresponding International Application No. PCT/JP2022/018982, dated Jul. 19, 2022, with translation (7 pages).

Written Opinion issued in corresponding International Application No. PCT/JP2022/018982, dated Jul. 19, 2022 (4 pages).

* cited by examiner

HEAT GENERATION CELL, HEAT GENERATION DEVICE, AND HEAT UTILIZATION SYSTEM

TECHNICAL FIELD

The present invention relates to a heat generating cell generating heat by the occlusion and the discharge of hydrogen, an integrated heat generating/heat exchanging type heat generating device including a plurality of the heat generating cells, and a heat utilization system utilizing heat generated in the heat generating device.

BACKGROUND ART

It is known that a hydrogen storage alloy has properties of repeatedly occluding and discharging a large amount of hydrogen in a certain reaction condition, and is accompanied with significant reaction heat when occluding and discharging hydrogen. A heat utilization system such as a heat pump system, a heat transport system, and a cooling (freezing) system, or a hydrogen storage system, which utilizes the reaction heat, has been proposed (for example, refer to PTL 1 and PTL 2).

The applicant et al. found that in a heat generating device including a heat generating element using a hydrogen storage alloy or the like, by configuring the heat generating element with a support, and a multilayer film supported on the support, heat is generated when occluding hydrogen to the heat generating element and when discharging hydrogen from the heat generating element. The applicant et al. previously proposed a heat utilization system and a heat generating device, on the basis of such findings (refer to PTL 3).

Specifically, the support provided in the heat generating element of the heat generating device is made of at least one of a porous body, a hydrogen permeable film, and a proton dielectric, and the multilayer film supported on the support, for example, is formed by alternately stacking a first layer that is made of a hydrogen storage metal or a hydrogen storage alloy and has a thickness of less than 1000 nm and a second layer that is made of a hydrogen storage metal or a hydrogen storage alloy, which is different from that of the first layer, or ceramics and has a thickness of less than 1000 nm.

CITATION LIST

Patent Literature

PTL 1: JPS56-100276A
PTL 2: JPS58-022854A
PTL 3: JP6749035B

SUMMARY OF INVENTION

Technical Problem

However, in the heat generating device proposed in PTL 3, the heat generating element generating heat is not incorporated in the state of being integrated at a high density, and thus, it is not possible for the heat generating element to efficiently generate heat, and there is room for improvement.

Therefore, as illustrated in FIG. 17, it is considered to respectively dispose a first flow path 106 for introducing hydrogen to a heat generating element 105 and a second flow path 107 for receiving hydrogen that has permeated through the heat generating element 105 on both sides of the heat generating element 105, and stack the heat generating element 105, and the first flow path 106 and the second flow path 107 at a high density such that a heat generating device 101 has a small and compact size, a high heat generating efficiency, and a high output. In the heat generating device 101 having such a configuration, the hydrogen introduced to the first flow path 106 permeates through the heat generating element 105, and thus, the heat generating element 105 generates heat. In this case, the hydrogen that has permeated through the heat generating element 105 (hereinafter, may be referred to as "permeated hydrogen") flows into the second flow path 107, and thus, the pressure of the second flow path 107 is lower than the pressure of the first flow path 106.

Here, since the heat generating element 105 is configured as an extremely thin flat plate made of a hydrogen storage metal or a hydrogen storage alloy, as illustrated in FIG. 18, the heat generating element 105 is bent and deformed into the shape of a circular arc-like curved surface to bulge to the second flow path 107 side with a lower pressure, and a large stress is generated due to the bending deformation, and thus, there is a possibility that the multilayer film is peeled off from the support of the heat generating element 105, the durability of the heat generating element 105 decreases, and the heat generating element 105 is not capable of stably generating heat.

The invention has been made in consideration of the problems described above, and an object thereof is to provide a heat generating cell that has high durability and is capable of stably generating heat, a heat generating device that has a high output and high durability while being small and compact, and a heat utilization system that is capable of efficiently recovering heat generated in the heat generating device and effectively utilizing the heat.

Solution to Problem

In order to attain the object described above, a heat generating cell according to the invention includes: a support having tubular shape; and a multilayer film formed on an inner peripheral surface of the support for generating heat by occlusion and discharge of hydrogen A heat generating device according to the invention includes: a plurality of heat generating cells including the heat generating cell described above; a sealed container; a plurality of separators dividing an inside of the sealed container into a first space, a second space, and a third space in an axial direction of the sealed container, the first space and the second space being locating at both ends in the axial direction in the sealed container; and a heater for heating each of the plurality of heat generating cells. The plurality of heat generating cells penetrate through the plurality of separators, and both ends of each of the plurality of heat generating cells in an axial direction are respectively opened to the first space and the second space.

A heat utilization system according to the invention includes: the heat generating device described above; a hydrogen supply line for supplying hydrogen to the first space of the heat generating device; a hydrogen recovery line for recovering hydrogen discharged from the second space of the heat generating device and returning the hydrogen to the hydrogen supply line; a heat utilization device for utilizing heat generated in the heat generating device; a heat medium supply line for supplying a heat medium discharged from the third space of the heat generating device to the heat utilization device; and a heat medium recovery line for recovering a heat medium discharged from the heat utilization device and returning the heat medium to the third space of the heat generating device.

Advantageous Effects of Invention

The heat generating cell according to the invention has a structure in which the multilayer film is formed on the inner peripheral surface of the tubular support with high rigidity, and thus, the heat generating cell is not easily deformed even when subjected to an external force, and the multilayer film formed on the inner peripheral surface of the support is not peeled off. Accordingly, the heat generating cell stably generates heat, and the durability thereof increases.

The heat generating device according to the invention includes the plurality of heat generating cells with high durability, which are integrated in the sealed container, and thus, a heat generation amount of the heat generating device increases and a high output is achieved while the heat generating device is small and compact, and the durability increases. Since the heat medium is heated by heat exchange between the hydrogen heated by the plurality of heat generating cells and the heat medium flowing through the third space, the heat generated by the plurality of heat generating cells is efficiently recovered by the heat medium. That is, the heat generating device functions as an integrated heat generating/heat exchanging g type heat generating device that also functions as a shell and tube type heat exchanger.

According to the heat utilization system according to the invention, the heat generated in the heat generating device with a high output, which also functions as the shell and tube type heat exchanger, is efficiently recovered by the heat medium, and thus, it is possible to drive the heat utilization device by effectively utilizing the heat recovered by the heat medium.

DESCRIPTION OF EMBODIMENTS

Hereinafter, embodiments of the invention will be described on the basis of the attached drawings.

[Heat Generating Cell]

The configuration of a heat generating cell according to the invention will be described below on the basis of FIG. 1 and FIG. 2.

Figure 1:
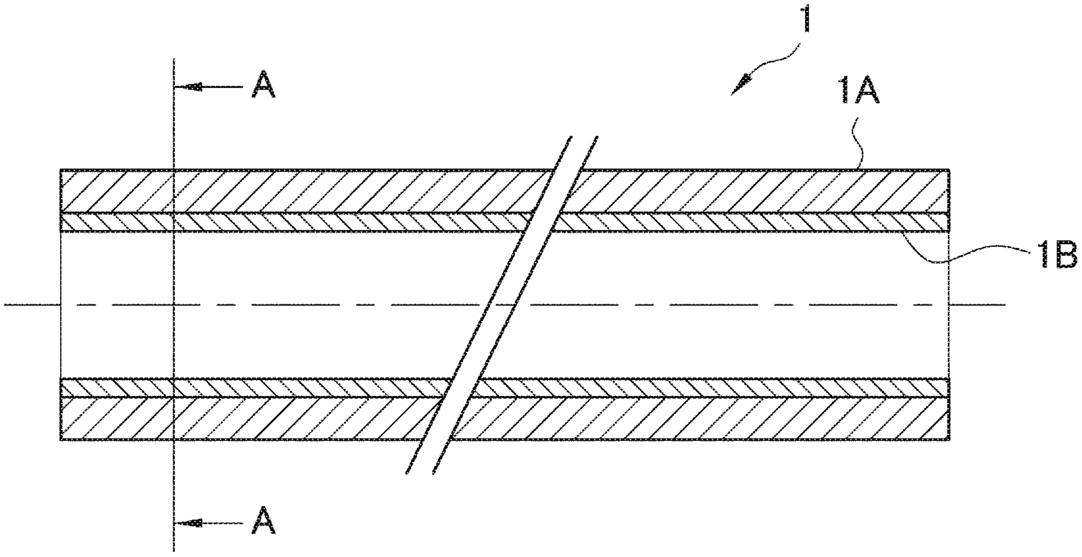
FIG. 1 is a cross-sectional side view of a heat generating cell according to the invention.
Figure 2:
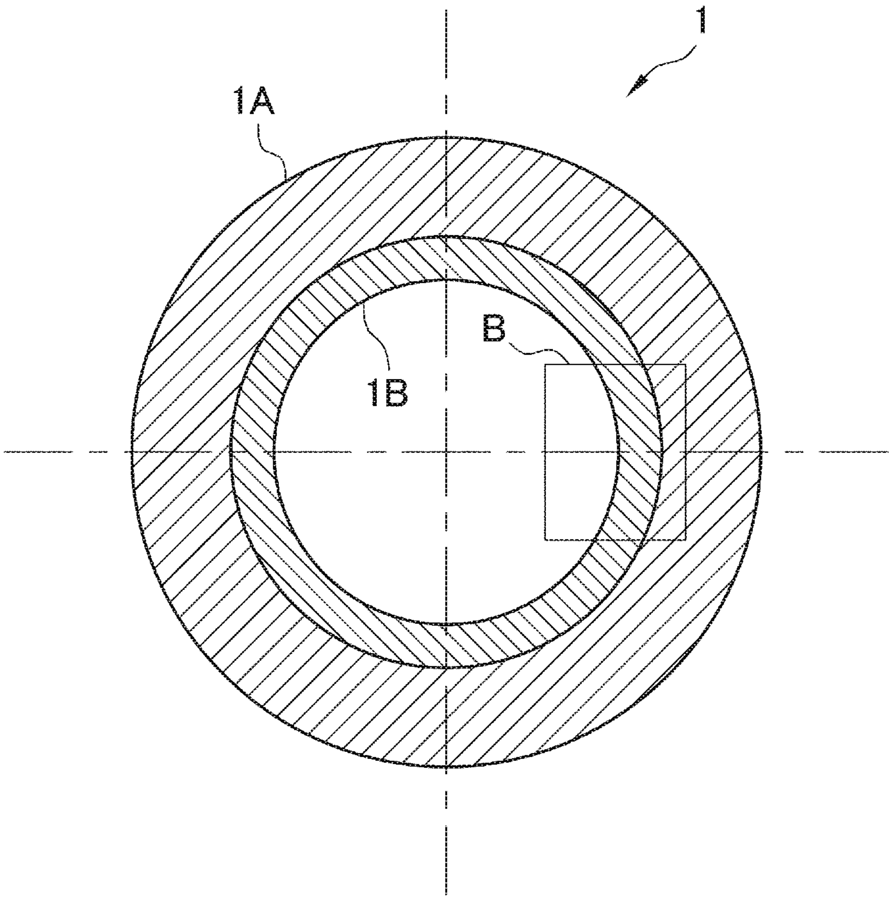
FIG. 2 is an enlarged cross-sectional view taken along line A-A in FIG. 1.

FIG. 1 is a cross-sectional side view of a heat generating cell according to the invention, and FIG. 2 is an enlarged cross-sectional view taken along line A-A in FIG. 1. A heat generating cell 1, which is illustrated, has a structure in which a multilayer film 1B for generating heat by the occlusion and the discharge of hydrogen is formed on the inner peripheral surface of a cylindrical (round pipe-shaped) support 1A formed of a porous metal sintered compact, a porous ceramic sintered compact, or a metal. Here, a plurality of pores having a size allowing hydrogen to permeate therethrough are formed in the porous metal sintered compact or the porous ceramic sintered compact for forming the support 1A. A material that does not inhibit a heat generating reaction between the hydrogen and the multilayer film 1B is used in the porous metal sintered compact or the porous ceramic sintered compact. Specifically, in the porous metal sintered compact, for example, Ti, SUS, Mo, and the like are used, and in the ceramic sintered compact, for example, $Al_2O_3$, MgO, Cao, and the like are used. As the metal for forming the support 1A, for example, stainless steel (SUS) is used.

In this embodiment, the cylindrical (round pipe-shaped) support is used as the support 1A, and a polygonal tubular (square pipe-shaped) support may be used.

The hydrogen includes hydrogen-based gas containing an isotope of the hydrogen, and as the hydrogen-based gas, either deuterium gas or protium gas is used. The protium gas contains a mixture of naturally occurring protium and deuterium, that is, a mixture in which the ratio of the protium is 99.985%, and the ratio of the deuterium is 0.015%. In the following description, gas containing the hydrogen-based gas will be collectively referred to as “hydrogen”. Here, the configuration of the multilayer film 1B will be described on the basis of FIG. 3.

<Configuration of Multilayer Film>

Figure 3:
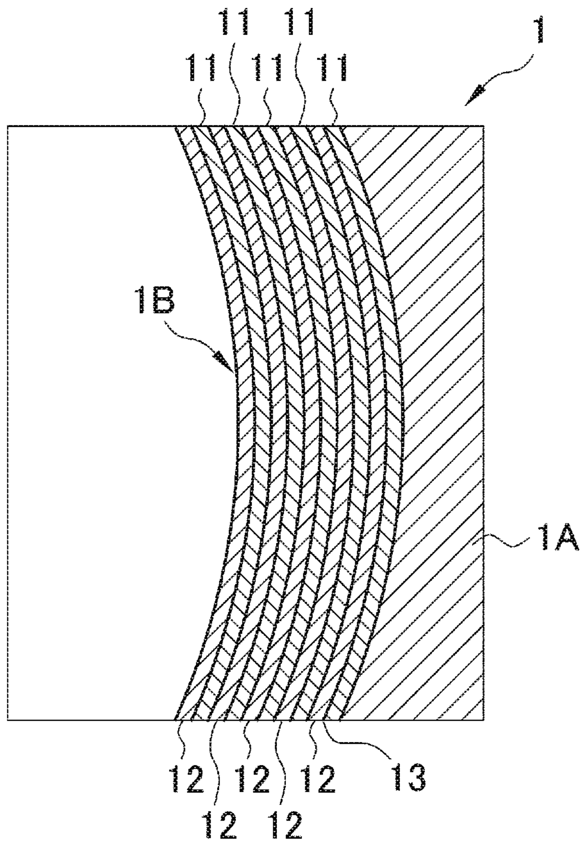
FIG. 3 is an enlarged detail view of a part B in FIG. 2 illustrating a configuration of a multilayer film of the heat generating cell according to the invention.

FIG. 3 is an enlarged detail view of a part B in FIG. 2. In this embodiment, the multilayer film 1B formed on the inner peripheral surface of the support 1A illustrated in the same drawing includes a first layer 11 formed of a hydrogen storage metal or a hydrogen storage alloy, and a second layer 12 formed of a hydrogen storage metal or a hydrogen storage alloy, which is different from that of the first layer 11, or ceramics, and a heterogeneous material interface 13 is formed between the first layer 11 and the second layer 12. In the example illustrated in FIG. 3, the multilayer film 1B is formed as a film structure of a total of 10 layers by alternately stacking five first layers 11 and five second layers 12 in this order on the inner peripheral surface of the support 1A. The number of first layers 11 and second layers 12 is arbitrary, and unlike the example illustrated in FIG. 3, the multilayer film may be formed by alternately stacking a plurality of second layers 12 and a plurality of first layers 11 in this order on the inner peripheral surface of the support 1A. The multilayer film 1B includes at least one or more first layers 11 and at least one or more second layers 12, and one or more heterogeneous material interfaces 13 formed between the first layer 11 and the second layer 12 may be provided.

Here, the first layer 11, for example, is made of any one of Ni, Pd, Cu, Mn, Cr, Fe, Mg, Co, and an alloy thereof. Here, as the alloy for forming the first layer 11, an alloy made of two or more types of Ni, Pd, Cu, Mn, Cr, Fe, Mg, and Co is preferable. As the alloy for forming the first layer 11, an alloy obtained by adding additives to Ni, Pd, Cu, Mn, Cr, Fe, Mg, and Co may be used.

The second layer 12, for example, is made of any one of Ni, Pd, Cu, Mn, Cr, Fe, Mg, Co, and an alloy thereof, or SiC. Here, as the alloy for forming the second layer 12, an alloy made of two or more types of Ni, Pd, Cu, Mn, Cr, Fe, Mg, and Co is preferable. As the alloy for forming the second layer 12, an alloy obtained by adding additives to Ni, Pd, Cu, Mn, Cr, Fe, Mg, and Co may be used.

A combination of the first layer 11 and the second layer 12 is preferably Pd—Ni, Ni—Cu, Ni—Cr, Ni—Fe, Ni—Mg, or Ni—Co when the types of elements are expressed as "First Layer-Second Layer". When the second layer 12 is made of ceramics, a combination of Ni—SiC is desirable.

Here, a mechanism by which the heat generating cell 1 generates heat (generates excess heat) will be described on the basis of FIG. 4.

Figure 4:
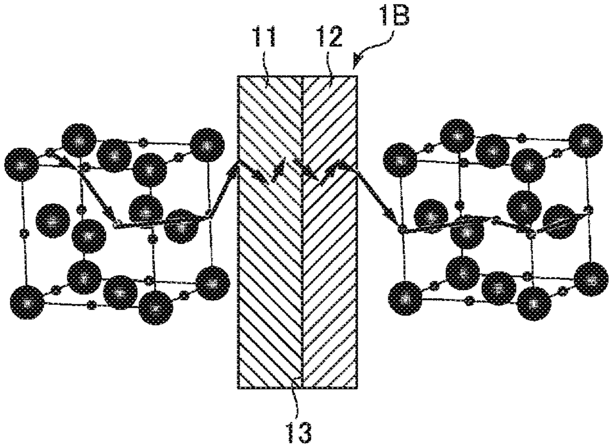
FIG. 4 is a schematic view illustrating a mechanism in which excess heat is generated in the multilayer film of the heat generating cell according to the invention.

FIG. 4 is a schematic view illustrating the mechanism of excess heat generation in the heat generating cell. The heterogeneous material interface 13 formed between the first layer 11 and the second layer 12 of the multilayer film 1B of the heat generating cell 1 allows hydrogen atoms to permeate therethrough. When hydrogen is supplied to the heat generating cell 1 from the inner peripheral surface side, the first layer 11 and the second layer 12 having a face-centered cubic structure, that is, the multilayer film 1B occludes the hydrogen. Here, even when the supply of the hydrogen is stopped, the heat generating cell 1 maintains a state where the hydrogen is occluded by the multilayer film 1B.

When heating is started by a heater of the heat generating cell 1, which is not illustrated, as illustrated in FIG. 4, hydrogen atoms in a metal lattice of the first layer 11 permeate through the heterogeneous material interface 13 to move into a metal lattice of the second layer 12, the hydrogen occluded in the multilayer film 1B is discharged, and the hydrogen is quantum-diffused while hopping inside the multilayer film 1B. Here, it is known that hydrogen is light, and hydrogen atoms are quantum-diffused while hopping a site (an octahedral or tetrahedral site) occupied by hydrogen of certain substance A and substance B. Accordingly, by heating the heat generating cell 1 with the heater, the hydrogen permeates through the heterogeneous material interface 13 by quantum diffusion, or the hydrogen permeates through the heterogeneous material interface 13 by diffusion, and thus, the heat generating cell 1 generates heat, and heat with a heat quantity greater than or equal to a heating amount by the heater is generated as excess heat.

It is desirable that the thickness of each of the first layer 11 and the second layer 12 in the multilayer film of the heat generating cell 1 is less than 1000 nm. When the thickness of each of the first layer 11 and the second layer 12 is less than 1000 nm, the first layer 11 and the second layer 12 can maintain a nano-structure that does not exhibit bulk properties. When the thickness of each of the first layer 11 and the second layer 12 is 1000 nm or more, it is difficult for the hydrogen to permeate through the multilayer film 1B. It is desirable that the thickness of each of the first layer 11 and the second layer 12 is less than 500 nm. As described above, when the thickness of each of the first layer 11 and the second layer 12 is less than 500 nm, the first layer 11 and the second layer 12 can maintain the nano-structure that does not completely exhibit the bulk properties.

<Method for Producing Heat Generating Cell>

Here, an example of a method for producing the heat generating cell 1 will be described.

The heat generating cell 1 is produced by preparing the cylindrical (round pipe-shaped) support 1A, setting a hydrogen storage metal or a hydrogen storage alloy to be the first layer 11 or the second layer 12 in a gas phase state by a vapor deposition equipment while rotating the support 1A around the axis, and alternately forming the first layer 11 and the second layer 12 on the inner peripheral surface of the support 1A by the aggregation or the adsorption of the hydrogen storage metal or the hydrogen storage alloy in the gas phase state. In this case, it is preferable to continuously form the first layer 11 and the second layer 12 in a vacuum state, and thus, the heterogeneous material interface 13 is formed between the first layer 11 and the second layer 12 without forming a natural oxide film.

As the vapor deposition equipment, a physical vapor deposition equipment vapor-depositing the hydrogen storage metal or the hydrogen storage alloy by a physical method is used, and as the physical vapor deposition equipment, a sputtering device, a vacuum vapor deposition equipment, or a chemical vapor deposition (CVD) equipment are used. The first layer 11 and the second layer 12 may be alternately formed by precipitating the hydrogen storage metal or the hydrogen storage alloy on the inner peripheral surface of the support 1A by an electroplating method.

Figure 5:
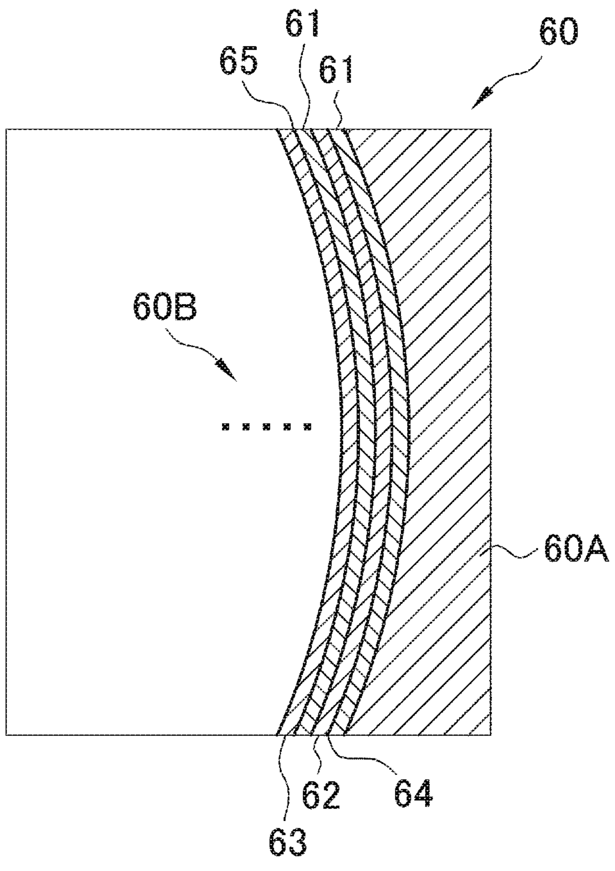
FIG. 5 is a cross-sectional view illustrating Modification Example 1 of the multilayer film of the heat generating cell according to the invention.
Figure 6:
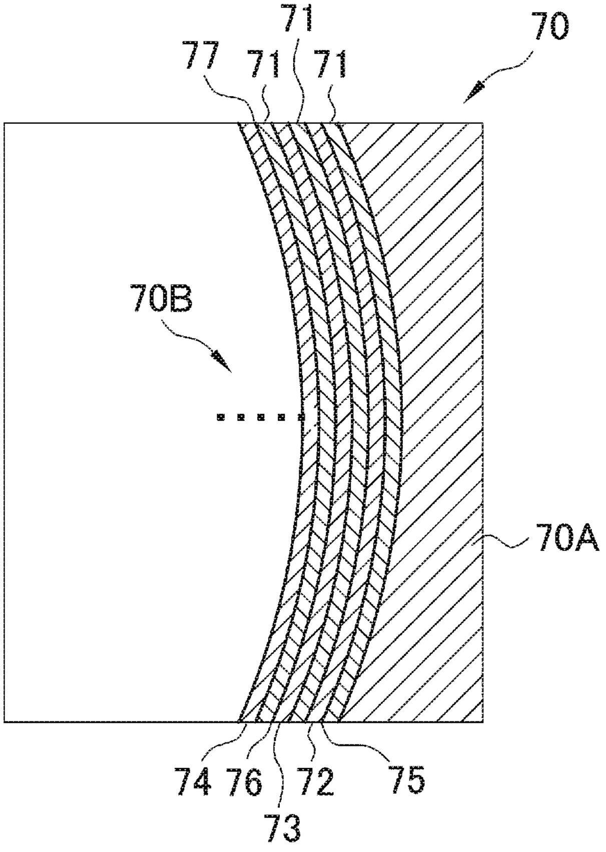
FIG. 6 is a cross-sectional view illustrating Modification Example 2 of the multilayer film of the heat generating cell according to the invention.

Here, Modification Examples 1 and 2 of the structure of the multilayer film of the heat generating cell are illustrated in FIG. 5 and FIG. 6, respectively. FIG. 5 and FIG. 6 are cross-sectional views illustrating a layer structure of multilayer films 60B and 70B according to Modification Examples 1 and 2.

Modification Example 1 of Layer Structure of Multilayer Film

In this embodiment described above, as illustrated in FIG. 3, the multilayer film 1B of the heat generating cell 1 is formed by alternately stacking five first layers 11 and five second layers 12, but in a heat generating cell 60 illustrated in FIG. 5, a third layer 63 is further provided in addition to a first layer 61 and a second layer 62. Here, it is desirable that the third layer 63 is made of a hydrogen storage metal, a hydrogen storage alloy, or ceramics, which is different from that of the first layer 61 and the second layer 62, and the thickness thereof is less than 1000 nm.

In the heat generating cell 60 illustrated in FIG. 5, the first layer 61, the second layer 62, the first layer 61, and the third layer 63, which form the multilayer film 60B, are stacked in this order on the inner peripheral surface of the support 60A. In the heat generating cell 60, a heterogeneous material interface 64 formed between the first layer 61 and the second layer 62 and a heterogeneous material interface 65 formed between the first layer 61 and the third layer 63 allow hydrogen atoms to permeate therethrough. The first layer 61, the second layer 62, and the third layer 63 may be stacked on the inner peripheral surface of the support 60A in the order of the first layer 61, the third layer 63, the first layer 61, and the second layer 62. That is, the multilayer film 60B has a stack structure in which the first layer 61 is provided between the second layer 62 and the third layer 63. The multilayer film 60B may include one or more third layers 63.

Here, the third layer 63 is made of any one of Ni, Pd, Cu, Cr, Fe, Mg, Co, or an alloy thereof, or SiC, Cao, $Y_2O_3$, TiC, $LaB_6$, SrO, and BaO. As the alloy for forming the third layer 63, an alloy made of two or more types of Ni, Pd, Cu, Cr, Fe, Mg, and Co is desirable. As the alloy for forming the third layer 63, an alloy obtained by adding an additive element to Ni, Pd, Cu, Cr, Fe, Mg, and Co.

In particular, it is desirable that the third layer 63 is made of any one of Cao, $Y_2O_3$, TiC, $LaB_6$, SrO, and BaO. In the heat generating cell 60 including the third layer 63 made of any one of Cao, $Y_2O_3$, TiC, $LaB_6$, SrO, and BaO, the occluding amount of hydrogen increases, the amount of hydrogen permeating through the heterogeneous material interfaces 64 and 65 increases, and a high output of excess heat is achieved.

It is desirable that the thickness of the third layer 63 made of any one of Cao, $Y_2O_3$, TiC, $LaB_6$, SrO, and BaO is 10 nm or less. Accordingly, the multilayer film 60B is capable of allowing hydrogen atoms to easily permeate therethrough. The third layer 63 made of any one of Cao, $Y_2O_3$, TiC, $LaB_6$, SrO, and BaO may be formed into the shape of an island but not a complete film. It is desirable that the first layer 61 and the third layer 63 are continuously formed in a vacuum state. Accordingly, only the heterogeneous material interface 65 is formed between the first layer 61 and the third layer 63 without forming a natural oxide film.

A combination of the first layer 61, the second layer 62, and the third layer 63 is desirably any one of Pd—CaO—Ni, Pd—$Y_2O_3$—Ni, Pd—TiC—Ni, Pd—$LaB_6$—Ni, Ni—CaO—Cu, Ni—$Y_2O_3$—Cu, Ni—TiC—Cu, Ni—$LaB_6$—Cu, Ni—Co—Cu, Ni—CaO—Cr, Ni—$Y_2O_3$—Cr, Ni—TiC—Cr, Ni—$LaB_6$—Cr, Ni—CaO—Fe, Ni—$Y_2O_3$—Fe, Ni—TiC—Fe, Ni—$LaB_6$—Fe, Ni—Cr—Fe, Ni—CaO—Mg, Ni—$Y_2O_3$—Mg, Ni—TiC—Mg, Ni—$LaB_6$—Mg, Ni—CaO—Co, Ni—$Y_2O_3$—Co, Ni—TiC—Co, Ni—$LaB_6$—Co, Ni-Cao-SiC, Ni—$Y_2O_3$—SiC, Ni—TiC—SiC, and Ni—$LaB_6$—SiC when the types of elements are expressed as "First Layer-Third Layer-Second Layer".

Modification Example 2 of Layer Structure of Multilayer Film

As illustrated in FIG. 6, a multilayer film 70B of a heat generating cell 70 according to this embodiment further includes a fourth layer 74 in addition to a first layer 71, a second layer 72, and a third layer 73. Here, it is desirable that the fourth layer 74 is made of a hydrogen storage metal, a hydrogen storage alloy, or ceramics, which is different from that of the first layer 71, the second layer 72, and the third layer 73, and the thickness thereof is less than 1000 nm.

In FIG. 6, the first layer 71, the second layer 72, the first layer 71, the third layer 73, the first layer 71, and the fourth layer 74 are stacked in this order on the inner peripheral surface of a support 70A. The first layer 71, the fourth layer 74, the first layer 71, the third layer 73, the first layer 71, and the second layer 72 may be stacked in this order on the inner peripheral surface of the support 70A. That is, the multilayer film 70B has a stack structure in which the second layer 72, the third layer 73, and the fourth layer 74 are stacked in any order, and the first layer 71 is provided between each of the second layer 72, the third layer 73, and the fourth layer 74. Here, a heterogeneous material interface 75 formed between the first layer 71 and the second layer 72, a heterogeneous material interface 76 formed between the first layer 71 and the third layer 73, and a heterogeneous material interface 77 formed between the first layer 71 and the fourth layer 74 allow hydrogen atoms to permeate therethrough. The multilayer film 70B may include one or more fourth layers 74.

The fourth layer 74 is made of any one of Ni, Pd, Cu, Cr, Fe, Mg, Co, or an alloy thereof, or Sic, $Y_2O_3$, TiC, $LaB_6$, SrO, and BaO. Here, it is desirable that the alloy for forming the fourth layer 74 contains two or more types of Ni, Pd, Cu, Cr, Fe, Mg, and Co. As the alloy for forming the fourth layer 74, an alloy obtained by adding additive element to Ni, Pd, Cu, Cr, Fe, Mg, and Co may be used.

In particular, it is desirable that the fourth layer 74 is made of any one of Cao, $Y_2O_3$, TiC, $LaB_6$, SrO, and BaO. Here, in the heat generating cell 70 including the fourth layer 74 made of any one of Cao, $Y_2O_3$, TiC, $LaB_6$, SrO, and BaO, the occluding amount of hydrogen increases, the amount of hydrogen permeating through the heterogeneous material interfaces 75, 76, and 77 increases, and thus, a high output of excess heat generated by the heat generating cell 70 is achieved. It is desirable that the thickness of the fourth layer 74 made of any one of Cao, $Y_2O_3$, TiC, $LaB_6$, SrO, and BaO is 10 nm or less in order to allow hydrogen atoms to easily permeate therethrough.

The fourth layer 74 made of any one of Cao, $Y_2O_3$, TiC, $LaB_6$, SrO, and BaO may be formed into the shape of an island but not a complete film. It is desirable that the first layer 71 and the fourth layer 74 are continuously formed in a vacuum state, and thus, only the heterogeneous material interface 77 is formed between the first layer 71 and the fourth layer 74 without forming a natural oxide film.

A combination of the first layer 71, the second layer 72, the third layer 73, and the fourth layer 74 is desirably a combination of Ni—CaO—Cr—Fe, Ni—$Y_2O_3$—Cr—Fe, Ni—TiC—Cr—Fe, and Ni—$LaB_6$—Cr—Fe when types of elements are expressed as "First Layer-Fourth Layer-Third Layer-Second Layer". The structure of the multilayer film 70B, for example, a thickness ratio of each layer, the number of each of the layers, and the material can be set suitably and in any manner in accordance with a temperature to be heated.

As described above, the heat generating cell 1 according to this embodiment, which is illustrated in FIG. 1, has a structure in which the multilayer film 1B is formed on the inner peripheral surface of the cylindrical (round pipe-shaped) support 1A with high rigidity, and thus, the heat generating cell is not easily deformed even when subjected to an external force, and the multilayer film 1B formed on the inner peripheral surface of the support 1A is not peeled off. Accordingly, the heat generating cell 1 stably generates heat, and the durability thereof increases.

The heat generating cell 1 is formed of the support 1A and the multilayer film 1B, but is not limited thereto, and may further include a base made of a hydrogen storage metal, a hydrogen storage alloy, or a proton dielectric. The heat generating cell including the base, for example, can be configured by forming the base on the inner peripheral surface of the support 1A and forming the multilayer film 1B on the inner peripheral surface of the base. The multilayer film 1B is not limited to a case where the multilayer film is formed only on the inner peripheral surface of the base, and may be formed only on the outer peripheral surface of the base, that is, between the support 1A and the base. The multilayer film 1B may be formed both of the inner peripheral surface and the outer peripheral surface of the base. A plurality of bases and a plurality of multilayer films 1B may be alternately stacked on the support 1A. As the hydrogen storage metal used in the base, for example, Ni, Pd, V, Nb, Ta, Ti, and the like are used. As the hydrogen storage alloy used in the base, for example, $LaNi_5$, $CaCu_5$, $MgZn_2$, $ZrNi_2$, $ZrCr_2$, TiFe, TiCo, $Mg_2Ni$, $Mg_2Cu$, and the like are used. As the proton dielectric used in the base, for example, a $BaCeO_3$-based (for example, $Ba(Ce_{0.95}Y_{0.05})O_{3-6}$) dielectric, a $SrCeO_3$-based (for example, $Sr(Ce_{0.95}Y_{0.05})O_{3-6}$) dielectric, a $CaZrO_3$-based (for example, $Ca(Zr_{0.95}Y_{0.05})O_{3-\alpha}$) dielectric, a $SrZrO_3$-based (for example, $Sr(Zr_{0.9}Y_{0.1})O_{3-\alpha}$) dielectric, $\beta Al_2O_3$, $\beta Ga_2O_3$, and the like are used. The base may be made of a porous body or a hydrogen permeable film. The porous body includes a plurality of pores having a size allowing hydrogen-based gas to pass therethrough. The porous body, for example, is made of a material such as a metal, a non-metal, and ceramics. It is preferable that the porous body is made of a material that does not inhibit the heat generating reaction between the hydrogen and the multilayer film 1B. The hydrogen permeable film is made of a material for allowing hydrogen to permeate therethrough. As the material of the hydrogen permeable film, a hydrogen storage metal or a hydrogen storage alloy is preferable. The hydrogen permeable film includes a film having a mesh-shaped sheet.

[Heat Generating Device]

Next, a heat generating device according to the invention will be described.

First Embodiment

Figure 7:
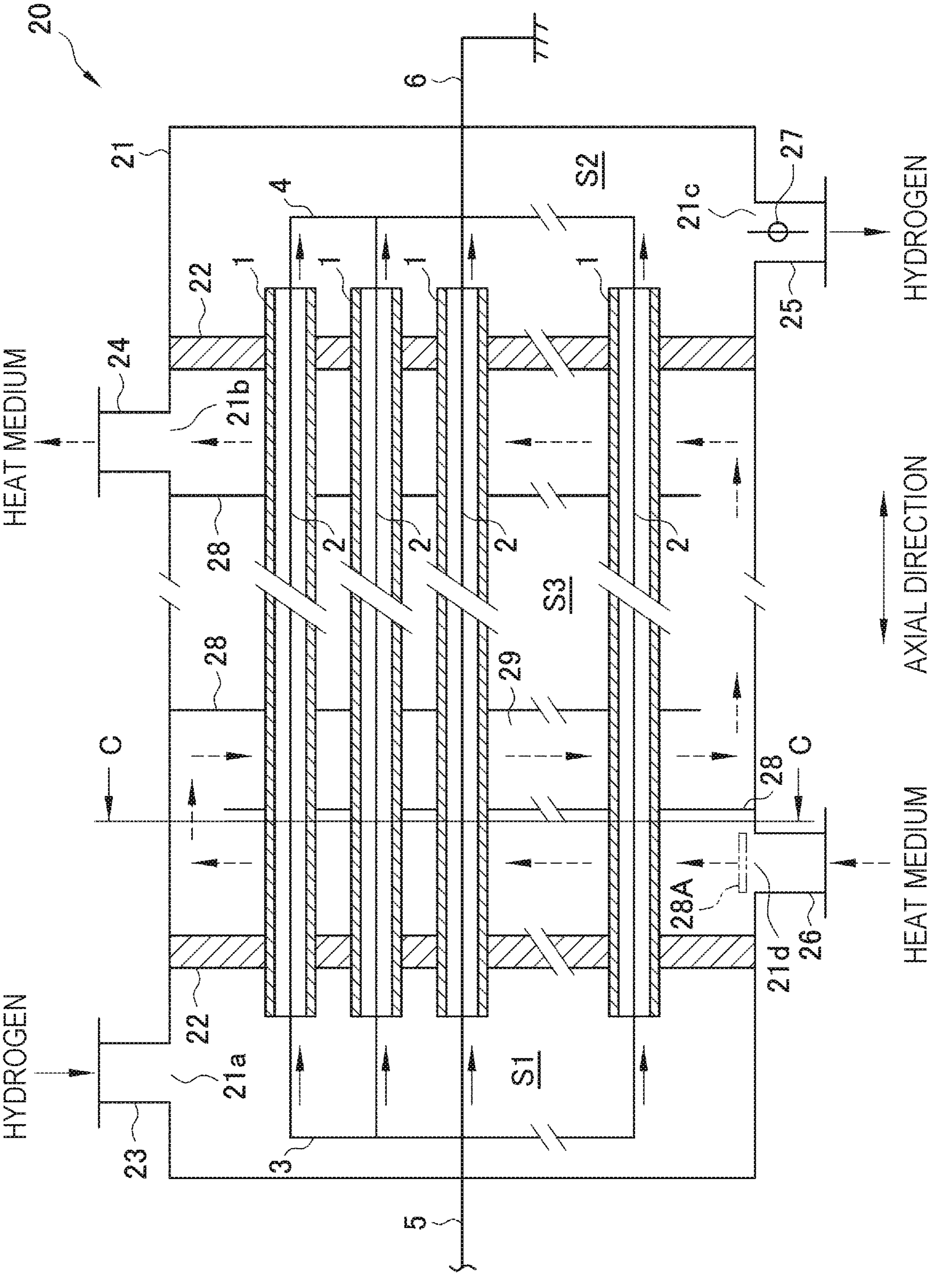
FIG. 7 is a cross-sectional side view of a heat generating device according to a first embodiment of the invention.
Figure 8:
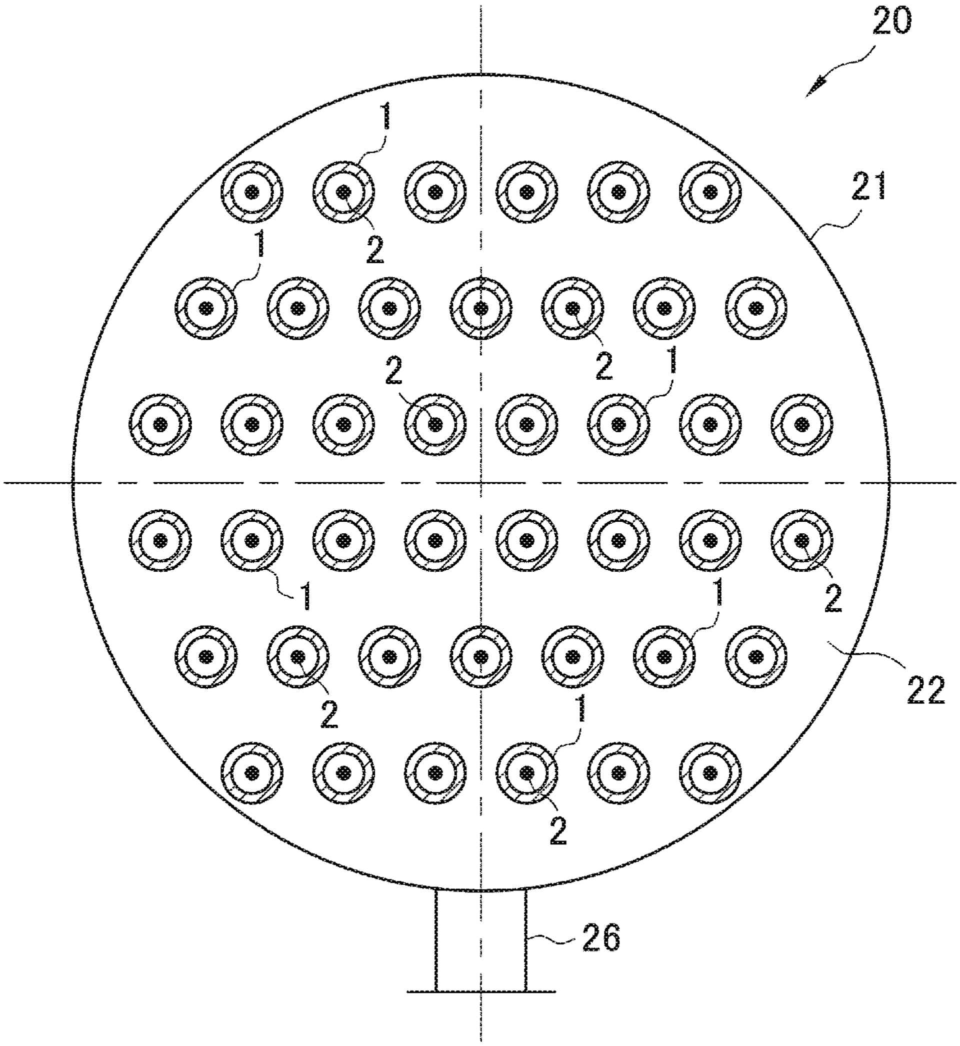
FIG. 8 is a cross-sectional view taken along line C-C in FIG. 7.

FIG. 7 is a cross-sectional side view of a heat generating device 20 according to a first embodiment of the invention, FIG. 8 is a cross-sectional view taken along line C-C in FIG. 7, and the heat generating device 20, which is illustrated, is an integrated heat generating/heat exchanging type heat generating device that also functions as a shell and tube type heat exchanger.

Specifically, the heat generating device 20 includes a hollow columnar sealed container (shell) 21 provided in a lateral direction (a horizontal direction), and the inside of the sealed container 21 is divided into three spaces of a first space S1, a second space S2, and a third space S3 in an axial direction (a right and left direction of FIG. 7) by two separators (tube plates) 22 disposed in a vertical direction. That is, the inside of the sealed container 21 is divided into the first space S1 and the second space S2 on both ends in the axial direction, and the third space S3 between the first space S1 and the second space S2.

In the upper portion of the sealed container 21, a hydrogen supply port 21*a* opened to the first space S1 and a heat medium discharge port 21*b* opened to the third space S3 are respectively opened, and a hydrogen supply nozzle 23 and a heat medium discharge nozzle 24 are connected to the hydrogen supply port 21*a* and the heat medium discharge port 21*b*, respectively. In the lower portion of the sealed container 21, a hydrogen discharge port 21*c* opened to the second space S2 and a heat medium supply port 21*d* opened to the third space S3 are respectively opened, and a hydrogen discharge nozzle 25 and a heat medium supply nozzle 26 are connected to the hydrogen discharge port 21*c* and the heat medium supply port 21*d*, respectively. Here, in the hydrogen discharge nozzle 25, an on-off valve 27 is provided.

The sealed container 21, the separator 22, the hydrogen supply nozzle 23, the heat medium discharge nozzle 24, the hydrogen discharge nozzle 25, and the heat medium supply nozzle 26 described above are made of stainless steel (SUS) or the like, which has high pressure resistance and high corrosion resistance, and has low heat conductivity. In this embodiment, the inside of the sealed container 21 is divided into three spaces of the first space S1, the second space S2, and the third space S3, but the inside of the sealed container 21 may be divided into four or more spaces.

In the sealed container 21, a plurality of the heat generating cells 1 illustrated in FIG. 1 penetrate through two separators 22 and are horizontally supported in parallel to each other, and both ends of the heat generating cells 1 in the axial direction are respectively opened to the first space S1 and the second space S2. Here, as illustrated in FIG. 8, the plurality of heat generating cells 1 are orderly disposed at an equal interval in an up and down direction and a right and left direction. In this embodiment, as the heat generating cell 1, a heat generating cell is used in which the support 1A is made of stainless steel (SUS).

In the center of each of the heat generating cells 1, a heater 2 that is heating means is provided, and both ends of the heater 2 are respectively supported by bus bars 3 and 4 having conductivity, which are a support member. A power supply, which is not illustrated, is electrically connected to one bus bar 3 (on the left side in FIG. 7) through a power cord 5, and a power cord 6 extending from the other bus bar 4 (on the right side in FIG. 7) is earthed (grounded). In this embodiment, the heater 2 is made of a heating wire with high electric resistance, such as molybdenum or tungsten.

In the third space S3 of the sealed container 21, a labyrinthine flow path 29 is formed by a plurality of baffle plates 28.

Next, the operation of the heat generating device 20 having structure described above will be described.

First, in a state where the on-off valve 27 provided in the hydrogen discharge nozzle 25 is opened, the sealed container 21 is depressurized to a predetermined pressure by driving a vacuum pump (not illustrated) connected to the hydrogen discharge nozzle 25, and then, the on-off valve 27 is closed.

Next, the hydrogen-based gas is supplied into the sealed container 21 from the hydrogen supply nozzle 23. The hydrogen-based gas is introduced to the first space S1 in the sealed container 21 from the hydrogen supply nozzle 23, and pass through the inside of each of the heat generating cells 1 from the first space S1 to flow into the second space S2. In such a process where the hydrogen-based gas pass through each of the heat generating cells 1, the hydrogen-based gas is occluded in the multilayer film 1B (refer to FIG. 1) formed on the inner peripheral surface of each of the heat generating cells 1. In this time, a hydrogen molecule is adsorbed on the inner peripheral surface of the multilayer film 1B. Then, the hydrogen molecule adsorbed on the inner peripheral surface of the multilayer film 1B is dissociated into two hydrogen atoms, the hydrogen atoms after dissociation penetrate into the multilayer film 1B, and the hydrogen atoms permeate through the heterogeneous material interface 13 (refer to FIG. 3) by quantum diffusion, or the hydrogen atoms permeate through the heterogeneous material interface 13 by diffusion.

Next, in a state where the on-off valve 27 provided in the hydrogen discharge nozzle 25 is opened, the sealed container 21 is vacuum-evacuated by driving the vacuum pump (not illustrated) connected to the hydrogen discharge nozzle 25, and a current flows into each of the heaters 2 from the power supply (not illustrated) through the power cord 5 and the bus bar 3, and thus, each of the heaters 2 generates heat, and each of the heat generating cells 1 is heated from the inner periphery side. Then, the hydrogen occluded in the multilayer film 1B of each of the heat generating cells 1 is discharged. In this time, the hydrogen atoms that have penetrated into the multilayer film 1B are returned to the inner peripheral surface of the multilayer film 1B and recombined, and thus, are discharged as the hydrogen molecule. In the process where the hydrogen atoms are returned to the inner peripheral surface of the multilayer film 1B, the hydrogen atoms permeate through the heterogeneous material interface 13 (refer to FIG. 3) by quantum diffusion, or the hydrogen atoms permeate through the heterogeneous material interface 13 by diffusion.

In the process where each of the heat generating cells 1 occludes the hydrogen, the hydrogen atoms permeate through the heterogeneous material interface 13 by quantum diffusion, or the hydrogen atoms permeate through the heterogeneous material interface 13 by diffusion to generate heat, and in the process where the hydrogen is discharged, the hydrogen atoms permeate through the heterogeneous material interface 13 by quantum diffusion, or the hydrogen atoms permeate through the heterogeneous material interface 13 by diffusion to generate heat. A method for intermittently supplying and discharging hydrogen with respect to the sealed container 21, and allowing the heat generating cell 1 to generate heat by the occlusion and the discharge of the hydrogen is referred to as a batch method. In the heat generating device 20 using a batch method, the supply of the hydrogen-based gas into the sealed container 21, the vacuum evacuation of the sealed container 21, and the heating of each of the heat generating cells 1 may be repeated, and the occlusion and the discharge of the hydrogen in each of the heat generating cells 1 may be repeated.

On the other hand, a heat medium is supplied to the third space S3 of the sealed container 21 from the heat medium supply nozzle 26, and the heat medium is heated by the heat generated from each of the heat generating cells 1 in the process of flowing through the labyrinthine flow path 29 formed in the third space S3, and thus, the temperature increases. That is, the heat medium is heated by heat exchange with respect to each of the heat generating cells 1 in the process of flowing through each of the heat generating cells 1, and efficiently recovers the heat generated in each of the heat generating cells 1. In this time, the heat medium flows along the labyrinthine flow path 29 formed in the third space S3 in the sealed container 21 while alternately changing the direction up and down, and thus, a heat exchange efficiency between the heat medium and each of the heat generating cells 1 increases. As described above, the heat medium flowing through the third space S3 of the sealed container 21 is heated by the heat exchange with respect to each of the heat generating cells 1, and the heat recovered by the heat medium is provided to a heat utilization system described below. As the heat medium, a heat medium having excellent heat conductivity and chemical stability is preferable, and for example, rare gas such as helium gas or argon gas, hydrogen gas, nitrogen gas, water vapor, the air, carbon dioxide, gas forming a hydride, and the like are used.

As described above, the heat generating device 20 according to this embodiment includes the plurality of heat generating cells 1 with high durability, which are integrated in the sealed container 21, and thus, the heat generation amount increases and a high output is achieved, and the durability increases. Since the heat medium is heated by the heat exchange between the plurality of heat generating cells 1 and the heat medium flowing through the third space S3, the heat generated by the plurality of heat generating cells 1 is efficiently recovered by the heat medium. That is, the heat generating device 20 is configured as an integrated heat generating/heat exchanging type heat generating device that also functions as a shell and tube type heat exchanger.

Figure 9:
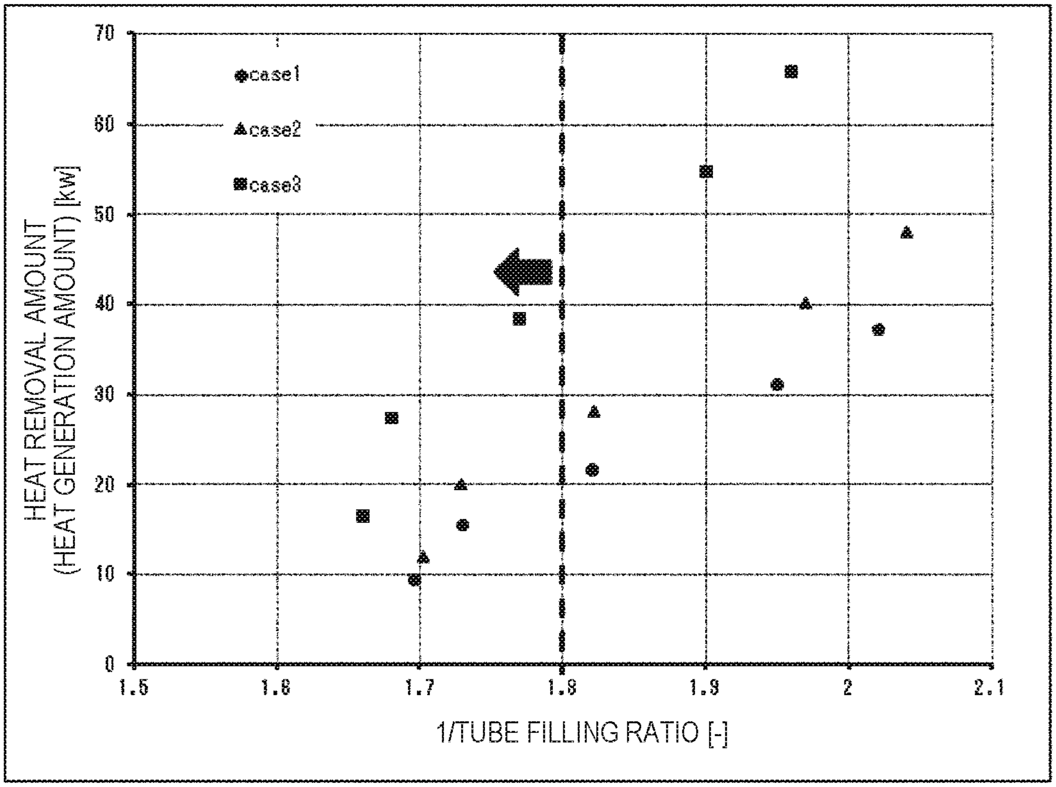
FIG. 9 is a diagram illustrating a relationship between a 1/tube filling ratio and a heat removal amount (a heat generation amount).
Figure 10:
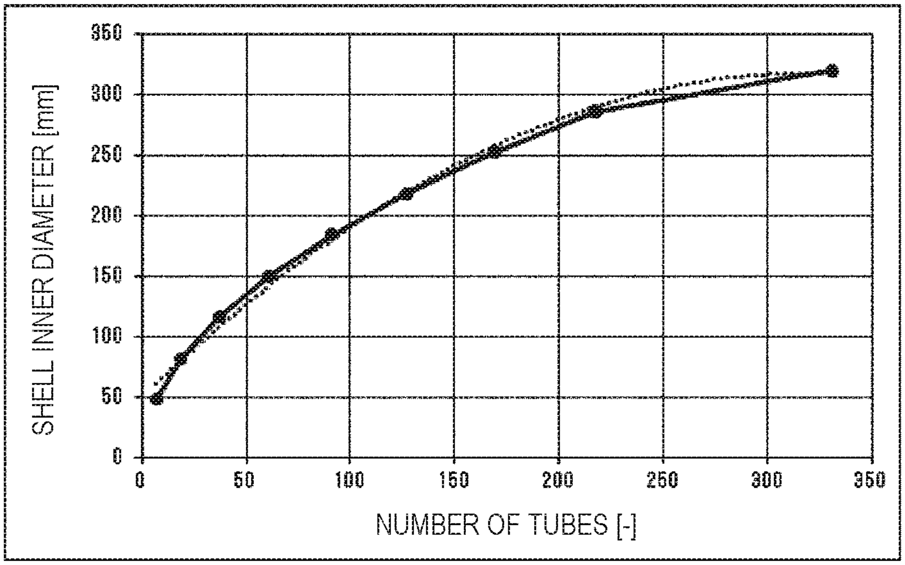
FIG. 10 is a diagram illustrating a relationship between the number of tubes and a shell inner diameter for obtaining a predetermined tube filling ratio.
Figure 11:
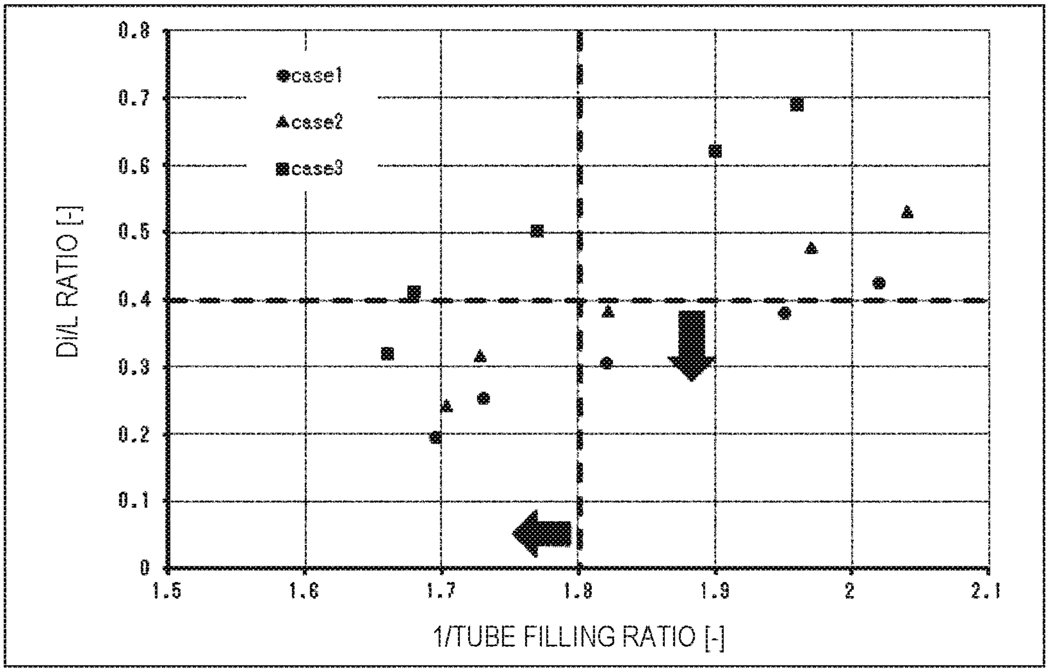
FIG. 11 is a diagram illustrating a relationship between the 1/tube filling ratio and a Di (a shell inner diameter)/L (a tube length) ratio.
Figure 12:
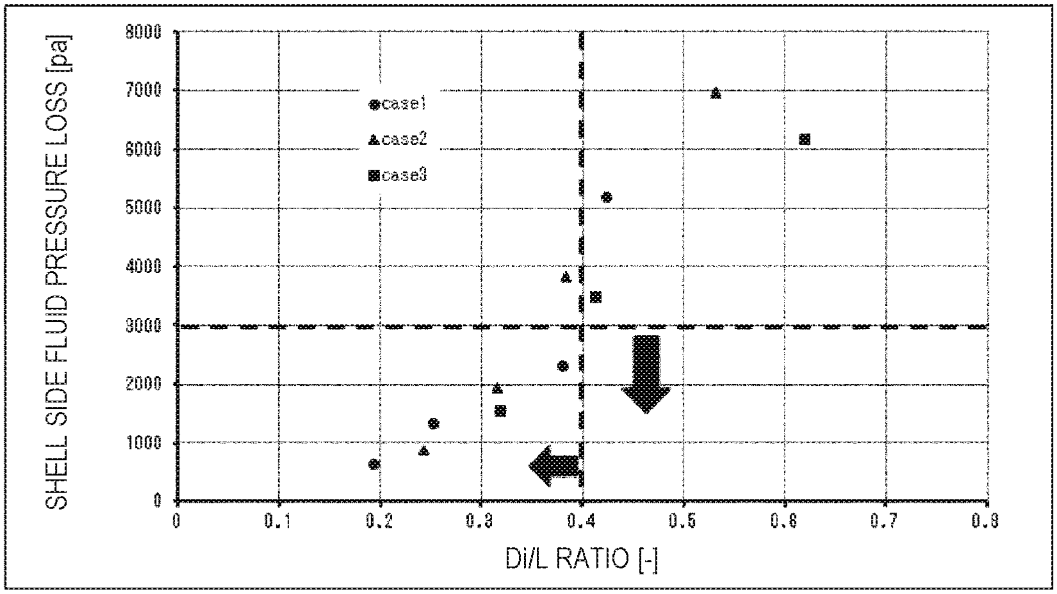
FIG. 12 is a diagram illustrating a relationship between the Di/L ratio and a shell side fluid pressure loss.
Figure 13:
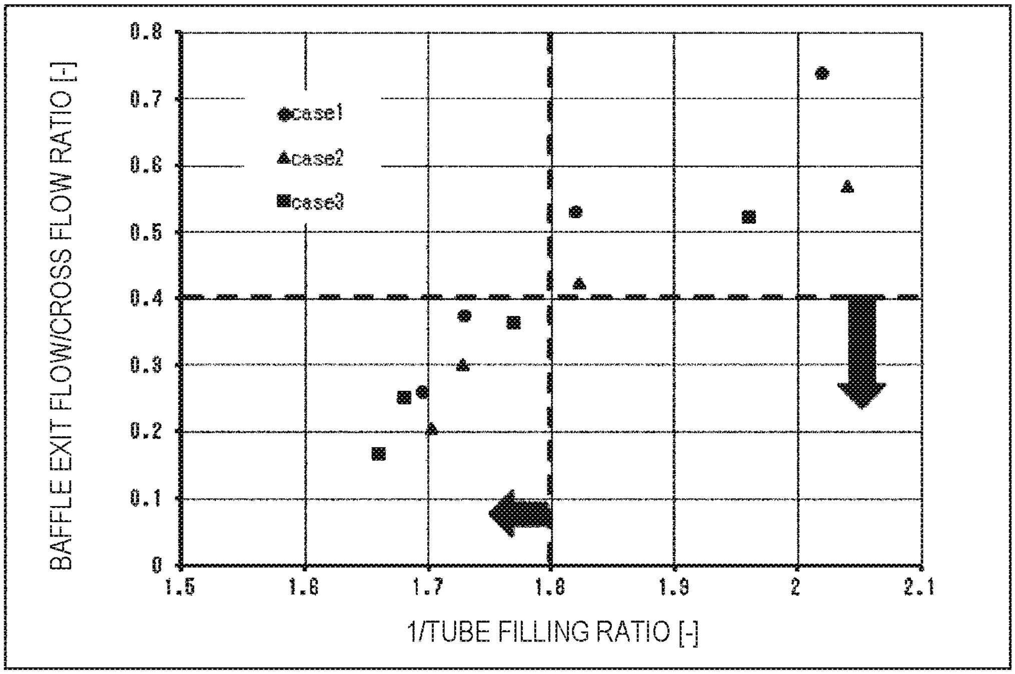
FIG. 13 is a diagram illustrating a relationship between the 1/tube filling ratio and a baffle exit flow/cross flow ratio.

Here, a change in a heat removal amount (a heat generation amount) or the like when changing the parameter of the heat generating device 20 (the outer diameter and the inner diameter of the support 1A (hereinafter, referred to as a "tube" or a "stainless steel tube")) will be described below, on the basis of FIG. 9 to FIG. 13. FIG. 9 is a diagram illustrating a relationship between a 1/tube filling ratio and the heat removal amount (the heat generation amount), FIG. 10 is a diagram illustrating a relationship between the number of tubes and a shell inner diameter for obtaining a predetermined tube filling ratio, FIG. 11 is a diagram illustrating a relationship between the 1/tube filling ratio and a Di (a shell inner diameter)/L (a tube length) ratio, FIG. 12 is a diagram illustrating a relationship between the Di/L ratio and a shell side fluid pressure loss (a pressure loss of the heat medium), and FIG. 13 is a diagram illustrating a relationship between the 1/tube filling ratio and a baffle exit flow/cross flow ratio.

Various studies have been conducted using a case where among various parameters of the heat generating device 20, the outer diameter and the inner diameter of the stainless steel tube (the support 1A) are changed as shown in Table 1 as each of Case 1, Case 2, and Case 3. Specifically, a case where the outer diameter and the inner diameter of the stainless steel tube are 27.2 mm and 23.2 mm is set to Case 1, a case where the outer diameter and the inner diameter of the stainless steel tube are 34 mm and 30 mm is set to Case 2, a case where the outer diameter and the inner diameter of the stainless steel tube are 45 mm and 41 mm is set to Case 3, and in all the cases, the length of the stainless steel tube is set to 1000 mm (constant).

TABLE 1

| | Stainless steel tube size [mm] | | | Tube | |
|---|---|---|---|---|---|
| Case | Outer diameter | Inner diameter | Length | arrangement pattern | Pitch [—] |
| 1 | 27.2 | 23.2 | 1000 | Regular | 1.25 |
| 2 | 34 | 30 | 1000 | triangle | |
| 3 | 45 | 41 | 1000 | arrangement | |

For the tube filling ratio and the Di/L ratio, when the tube outer diameter is set to do, the number of tubes is set to Nt, and the shell (sealed container) inner diameter is set to Di, the tube filling ratio is a value obtained by the following expression.

$$\text{Tube Filling Ratio} = \text{Total Tube Sectional Area/Shell Inner Sectional Area} = Nt \times do^2/Di^2 \quad (1)$$

In the heat generating device 20, a change in the heat removal amount (the heat generation amount) (KW) with respect to the 1/tube filling ratio in each of Cases 1, 2, and 3 is illustrated in FIG. 9. For each of Cases 1, 2, and 3, a desired region having a small shell side pressure loss and a high heat exchange efficiency is a range of 1/Tube Filling Ratio≤1.8. When calculating the heat removal amount (the heat generation amount) (KW) illustrated in FIG. 9, the inflow temperature of the heat medium (argon gas) is set to 650° C., and the temperature of a heat generating element (the temperature in the tube) is set to 800° C.

Here, the relationship between the number of tubes and the shell inner diameter for retaining the tube filling ratio obtained by Expression (1) described above at a predetermined value is illustrated in FIG. 10. A result illustrated in FIG. 10 indicates a relationship between the shell inner diameter and the number of tubes for allowing the tube filling ratio to be 2.0 when setting the outer diameter do of the tube (support 1A) to be constant (27.2) mm.

A change in the Di/L ratio with respect to the 1/tube filling ratio in each of Cases 1, 2, and 3 is illustrated in FIG. 11, and a change in the shell side fluid pressure loss (the pressure loss of the heat medium) with respect to the Di/L ratio is illustrated in FIG. 12. When the Di/L ratio is greater than 0.4, that is, when the plurality of baffle plates 28 are disposed in a short section in the shell (the sealed container) 21, the pressure loss of the heat medium tends to increase. Accordingly, in order to suppress the pressure loss of the heat medium to a constant value or less, the Di/L ratio is to be suppressed to 0.4 or less. When assuming the use of an axial flow fan in order to circulate the heat medium, it is desirable that the pressure loss of the heat medium is 3000 Pa (305 mmHg) or less. On the contrary, when the Di/L ratio is 0.15 or less, there is a concern that a pipe may vibrate due to the flow resistance of the heat medium, but in such a case, as illustrated in FIG. 7, the problem can be solved by disposing an inrush prevention plate 28A in the vicinity of the heat medium supply port 21*d* in the sealed container (the shell) 21.

Therefore, when considering the results illustrated in FIG. 9 to FIG. 12, a range in which the 1/tube filling ratio illustrated in FIG. 11 is 1.8 or less and the Di/L ratio is 0.4 or less is a desired range.

When the 1/tube filling ratio is greater than 1.8, in the shell (the sealed container) 21, the heat medium exits and flows from a gap between the baffle plate 28 and the tube (the support 1A) in a radial direction (such a flow will be referred to as a "baffle exit flow" or an "invalid flow"), but when the flow rate of the baffle exit flow is greater than 40% of the flow rate of the valid flow of the heat medium (hereinafter, referred to as a "cross flow") in the labyrinthine flow path 29 in the shell 21, a heat exchange efficiency considerably decreases. Here, the relationship between the baffle exit flow/cross flow ratio and the 1/tube filling ratio in each of Cases 1, 2, and 3 is illustrated in FIG. 13.

Therefore, in order to suppress the pressure loss of the heat medium to 3000 Pa or less while ensuring a high heat exchange efficiency, a range is desirable in which the 1/tube filling ratio illustrated in FIG. 13 is 1.8 or less and the baffle exit flow/cross flow ratio is 0.4 or less.

Second Embodiment

Next, a heat generating device 20A according to a second embodiment of the invention will be described below, on the basis of FIG. 14.

Figure 14:
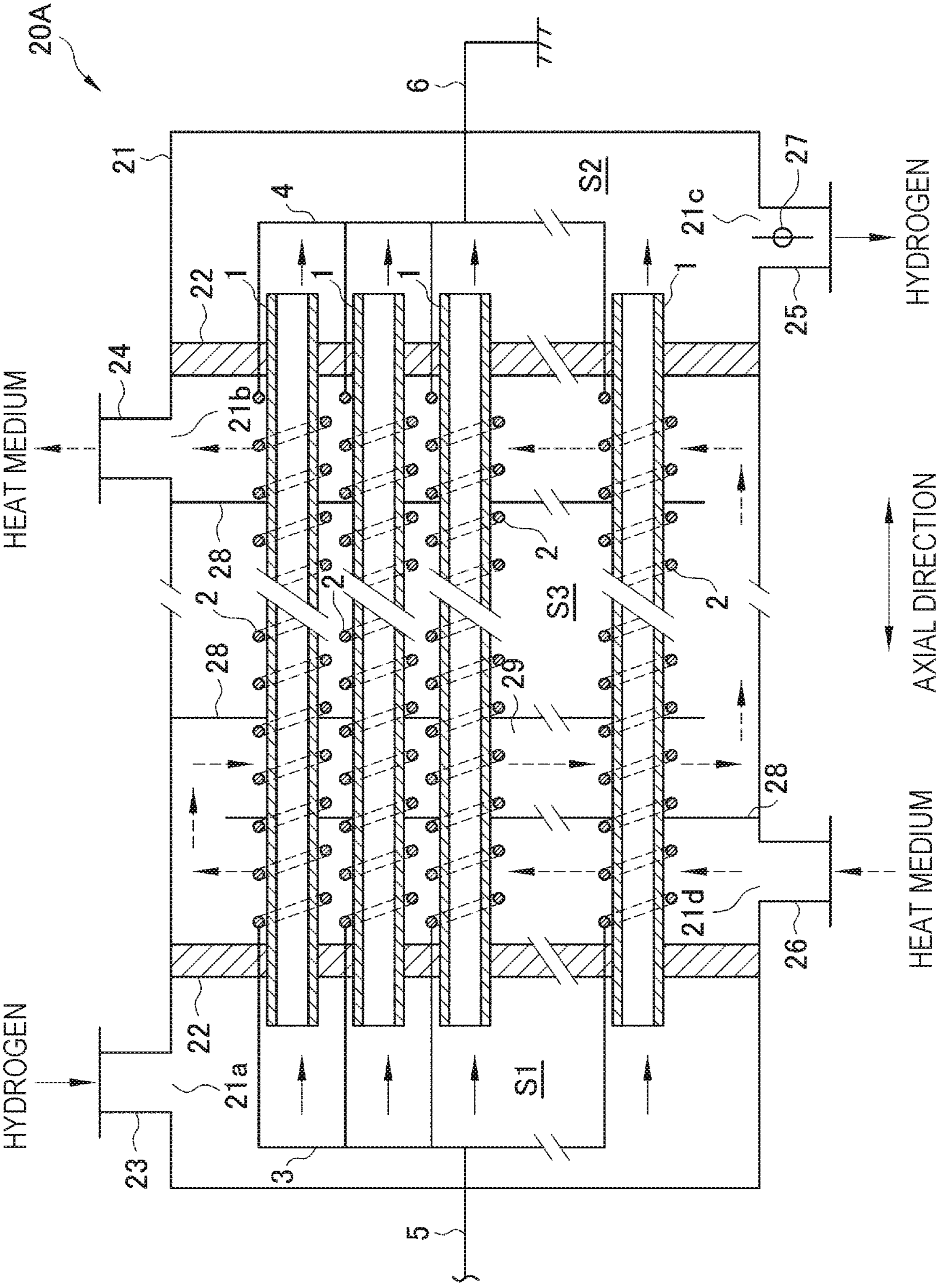
FIG. 14 is a cross-sectional side view of a heat generating device according to a second embodiment of the invention.

FIG. 14 is a cross-sectional side view of the heat generating device 20A according to the second embodiment of the invention, and in this drawing, the same reference numerals will be applied to the same elements as those illustrated in FIG. 7, and hereinafter, the repeated description thereof will be omitted.

The basic configuration of the heat generating device 20A according to this embodiment is the same as that of the heat generating device 20 according to the first embodiment, except that the heater 2 is wound around the outer periphery of each of the heat generating cells 1 into the shape of a spiral. As with the heat generating device 20, the heat generating device 20A is a heat generating device using a batch method that intermittently supplies and discharges hydrogen with respect to the sealed container 21.

In the heat generating device 20A according to this embodiment, each of the heat generating cells 1 is heated from the outer periphery side by the heater 2, but such an operation is the same as that of the heat generating device 20 according to the first embodiment, and the same effect as the effect obtained by the heat generating device 20 can be obtained.

Third Embodiment

Next, a heat generating device 20B according to a third embodiment of the invention will be described below, on the basis of FIG. 15.

Figure 15:
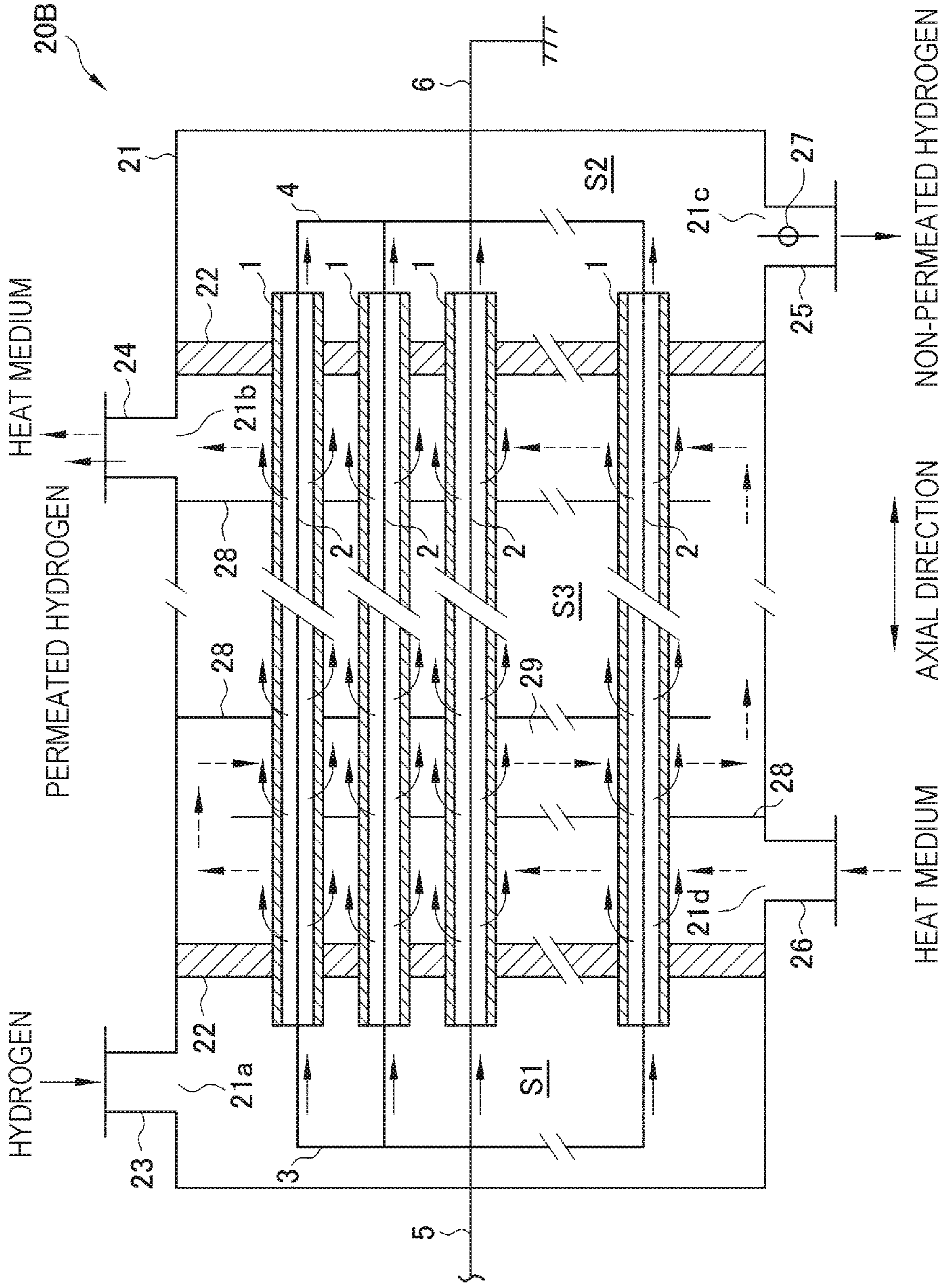
FIG. 15 is a cross-sectional side view of a heat generating device according to a third embodiment of the invention.

FIG. 15 is a cross-sectional side view of the heat generating device 20B according to the third embodiment of the invention, and in this drawing, the same reference numerals will be applied to the same elements as those illustrated in FIG. 7, and hereinafter, the repeated description thereof will be omitted.

The heat generating device 20B according to this embodiment is different from the heat generating device 20 according to the first embodiment only in that a heat generating cell in which the support 1A (refer to FIG. 1) is made of a porous metal sintered compact or a porous ceramic sintered compact that allows hydrogen to permeate therethrough is used as the heat generating cell 1.

Next, the operation of the heat generating device 20B will be described.

First, in a state where the on-off valve 27 provided in the hydrogen discharge nozzle 25 is opened, the sealed container 21 is depressurized to a predetermined pressure by driving the vacuum pump (not illustrated) connected to the hydrogen discharge nozzle 25. Next, the hydrogen-based gas is supplied to the first space S1 of the sealed container 21 from the hydrogen supply nozzle 23, and the heat medium is supplied to the third space S3 of the sealed container 21 from the heat medium supply nozzle 26. In the heat generating device 20B, the hydrogen-based gas flows inside each of the heat generating cells 1, and the heat medium flows outside each of the heat generating cells 1, and thus, a difference in a hydrogen partial pressure occurs inside and outside each of the heat generating cells 1, the hydrogen permeates through the multilayer film 1B (refer to FIG. 3) of each of the heat generating cells 1 due to a difference in the hydrogen partial pressure, and each of the heat generating cells 1 generates heat due to the permeation of the hydrogen. Specifically, the hydrogen molecule is adsorbed on the inner peripheral surface of the multilayer film 1B of each of the heat generating cells 1, and the hydrogen molecule is dissociated into two hydrogen atoms. Then, the hydrogen atoms after dissociation penetrate (are occluded) into the multilayer film 1B, the hydrogen atoms are recombined on the outer peripheral surface of the multilayer film 1B (a surface in contact with the support 1A) and discharged as the hydrogen molecule. As described above, when the hydrogen atoms move to the outer peripheral surface from the inner peripheral surface of the multilayer film 1B, the hydrogen atoms permeate through the heterogeneous material interface 13 (refer to FIG. 3) by quantum diffusion, or the hydrogen atoms permeate through the heterogeneous material interface 13 by diffusion, and thus, each of the heat generating cells 1 generates heat. A method for allowing the heat generating cell 1 to generate heat by utilizing a difference in the hydrogen partial pressure to allow the permeation of the hydrogen is referred to as a permeation method. In the heat generating device 20B using a permeation method, the hydrogen continuously permeates through each of the heat generating cells 1, and thus, it is possible to efficiently generate excess heat.

The hydrogen (the permeated hydrogen) at a high temperature, which has permeated through each of the heat generating cells 1, flows out into the third space S3, and is supplied to the third space S3 from the heat medium supply nozzle 26 to perform heat exchange with respect to the heat medium flowing through the labyrinthine flow path 29 of the third space S3, and thus, mixed gas of the hydrogen and the heat medium is discharged to the outside of the sealed container 21 from the heat medium discharge nozzle 24. Hydrogen (non-permeated hydrogen) that has not permeated through each of the heat generating cells 1 is discharged to the outside of the sealed container 21 from the hydrogen discharge nozzle 25.

In the heat generating device 20B according to this embodiment, as with the heat generating device 20 according to the first embodiment, each of the heat generating cells 1 is heated from the inner periphery side by the heater 2, and such an operation is the same as that of the heat generating device 20 according to the first embodiment, and thus, the same effect as the effect obtained by the heat generating device 20 can be obtained. In this embodiment, the on-off valve 27 is opened, and the non-permeated hydrogen is discharged, but in consideration of the occurrence of a hydrogen pressure difference, it may be more preferable to close the on-off valve 27.

[Heat Utilization System]

Next, a heat utilization system according to the invention will be described below, on the basis of FIG. 16.

Figure 16:
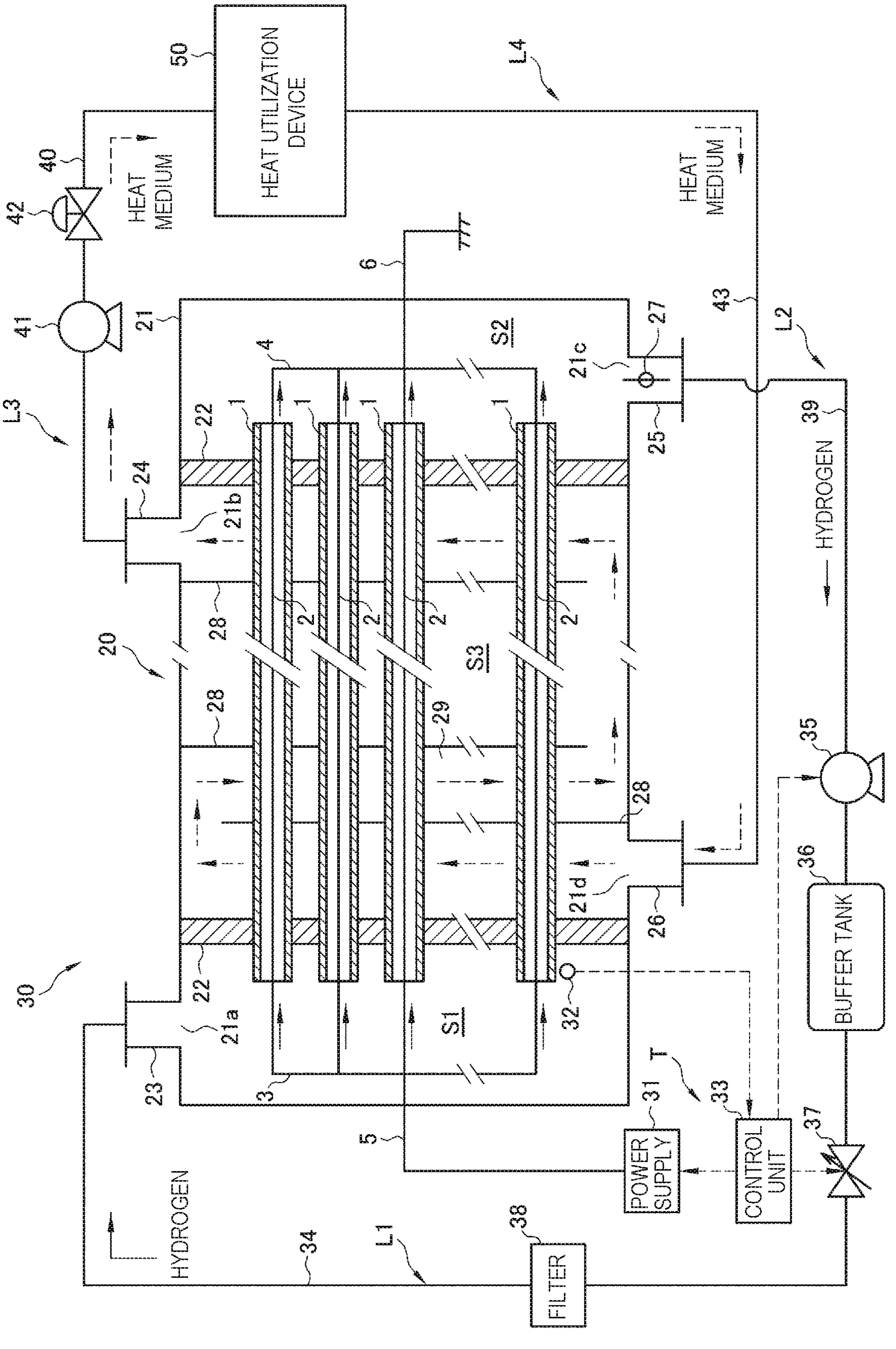
FIG. 16 is a block diagram illustrating a configuration of a heat utilization system according to the invention.
Figure 17:
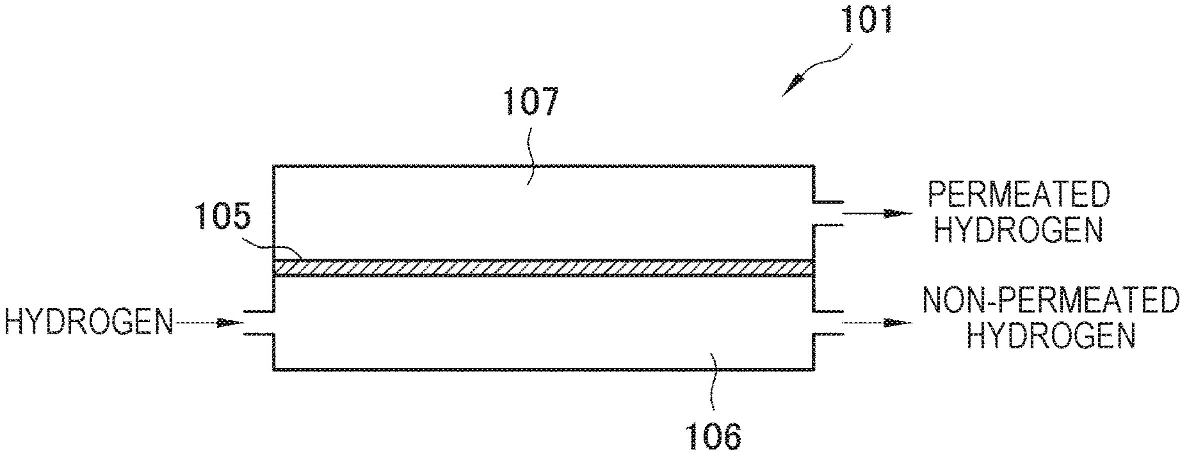
FIG. 17 is a cross-sectional view illustrating a basic configuration of a heat generating device including a plate-shaped heat generating element.
Figure 18:
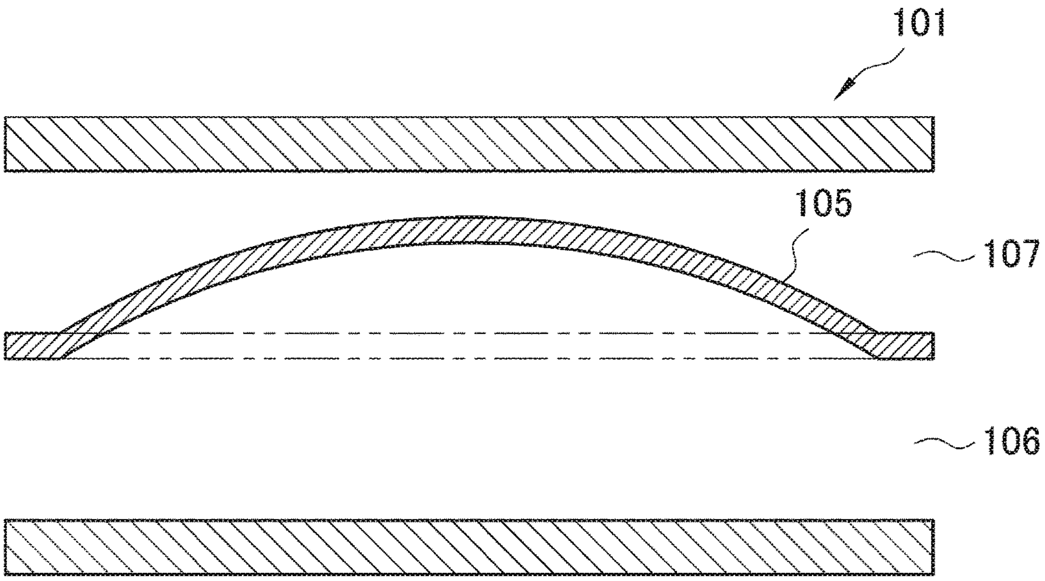
FIG. 18 is a schematic cross-sectional view illustrating deformation of a heat generating element of a heat generating device illustrated in FIG. 17.

FIG. 16 is a block diagram illustrating the configuration of the heat utilization system according to the invention, and a heat utilization system 30, which is illustrated, includes the heat generating device 20 using a batch method, which is illustrated in FIG. 7, a heat utilization device 50, a temperature adjustment unit T, a hydrogen supply line L1, a hydrogen recovery line L2, a heat medium supply line L3, and a heat medium recovery line L4. In this embodiment, the heat generating device 20 using a batch method is used, but the heat generating device 20A using a batch method or the heat generating device 20B using a permeation method may be used.

Hereinafter, the temperature adjustment unit T, the hydrogen supply line L1, the hydrogen recovery line L2, the heat medium supply line L3, and the heat medium recovery line L4 will be respectively described.

(Temperature Adjustment Unit)

The temperature adjustment unit T adjusts the temperature of the heat generating cell 1 built in the heat generating device 20 and maintains the heat generating cell 1 at an optimal temperature (for example, 50° C. to 1500° C.) to generate heat, and includes a plurality of heaters 2 respectively passing through the heat generating cells 1, a power supply 31 supplying power to the heaters 2, a temperature sensor 32 such as a thermocouple detecting the temperature of the heater 2, and a control unit 33 controlling the output of the power supply 31 on the basis of the temperature detected by the temperature sensor 32. The control unit 33 includes a central processing unit (CPU), a storage unit such as a read only memory (ROM) or a random access memory (RAM), and the like, and in CPU, various arithmetic processing pieces are executed by using a program, data, or the like stored in ROM or RAM.

(Hydrogen Supply Line)

The hydrogen supply line L1 supplies hydrogen at a low temperature to the first space S1 in the sealed container 21 from the hydrogen supply nozzle 23 through a supply pipe 34, the supply pipe 34 extends from an ejection side of a circulation pump 35, and in the middle of the supply pipe 34, a buffer tank 36, a motorized pressure adjustment valve (a pressure reducing valve) 37, and a filter 38 are provided. The circulation pump 35 and the pressure adjustment valve 37 are electrically connected to the control unit 33, and the operation of the circulation pump 35 and the pressure adjustment valve 37 is controlled in accordance with a control signal output from the control unit 33. In the circulation pump 35, for example, a metal bellows pump is used.

The buffer tank 36 temporarily stores the hydrogen and absorbs a variation in the flow rate of the hydrogen. The pressure adjustment t valve 37 functions to adjust the pressure of hydrogen that is supplied to the heat generating device 20 from the buffer tank 36 by receiving the control signal from the control unit 33 such that the opening degree thereof is adjusted.

The filter 38 removes impurities contained in the hydrogen. Here, the amount of hydrogen (a hydrogen permeation amount) permeating through the multilayer film 1B of the heat generating cell 1 depends on the temperature of the heat generating cell 1, a pressure difference inside and outside the heat generating cell 1, and the surface state of the inner peripheral surface of the heat generating cell 1, and when the impurities are contained in the hydrogen, the impurities are attached to the inner peripheral surface of the heat generating cell 1, and thus, the surface state of the heat generating cell 1 may be degraded. When the surface state of the heat generating cell 1 is degraded, a problem occurs in which the adsorption and the dissociation of the hydrogen molecule on the inner peripheral surface of the multilayer film 1B of the heat generating cell 1 are inhibited, and the hydrogen permeation amount decreases. As a component inhibiting the adsorption and the dissociation of the hydrogen molecule on the inner peripheral surface of the multilayer film 1B of the heat generating cell 1, for example, water (including water vapor), hydrocarbon (methane, ethane, methanol, ethanol, and the like), C, S, Si, and the like are considered.

By the filter 38 removing water (including water vapor), hydrocarbon, C, S, Si, and the like, as the impurities contained in the hydrogen or the heat medium, a decrease in the hydrogen permeation amount of the heat generating cell 1 is suppressed.

(Hydrogen Recovery Line)

The hydrogen recovery line L2 is a line for recovering the hydrogen that passes through each of the heat generating cells 1 from the first space S1 of the heat generating device 20 and flows into the second space S2 and returning the hydrogen to the hydrogen supply line L1, and a recovery pipe 39 extending from the hydrogen discharge nozzle 25 of the sealed container 21 is connected to a suction side of the circulation pump 35.

(Heat Medium Supply Line)

The heat medium supply line L3 is a line for supplying the heat medium discharged from the third space S3 of the heat generating device 20 to the heat utilization device 50, and includes a supply pipe 40 that extends from the heat medium discharge nozzle 24 of the sealed container 21 and is connected to the inlet side of the heat utilization device 50. In the middle of the supply pipe 40, a circulation pump 41 and a flow rate control valve 42 are provided. As the circulation pump 41, a metal bellows pump and the like are used, and as the flow rate control valve 42, a variable leak valve and the like are used.

(Heat Medium Recovery Line)

The heat medium recovery line L4 is a line for recovering the heat medium that has supplied the heat to the heat utilization device 50 and returning the heat medium to the third space S3 of the heat generating device 20, and includes a recovery pipe 43 that extends from the outlet side of the heat utilization device 50 utilizing the heat generated in the heat generating device 20 and is connected to the heat medium supply nozzle 26 of the sealed container 21.

Examples of the heat utilization device 50 include a heating device, a heat pump system, a heat transport system, and a cooling (freezing) system, which are used for the preheating of the air for combustion that is supplied to a boiler, the heating of an adsorbent that has absorbed $CO_2$ by a chemical absorption method, the heating of raw material gas containing $CO_2$ and $H_2$ in a device for producing methane, and the like, in addition to a power generator converting thermal energy into electric energy.

(Operation of Heat Utilization System)

Next, the operation of the heat utilization system 30 configured as described above will be described.

When the circulation pump 35 is driven in accordance with the control signal from the control unit 33, the hydrogen ejected from the circulation pump 35 is introduced into the first space S1 of the heat generating device 20 from the hydrogen supply nozzle 23 through the supply pipe 34 of the supply line L1. The pressure variation of the hydrogen is suppressed by the buffer tank 36 in the process where the hydrogen flows through the supply pipe 34, and the hydrogen is depressurized to a predetermined value by the pressure adjustment valve 37.

The plurality of heaters 2 provided in the heat generating device 20 generate heat by the power supplied from the power supply 31, and heat each of the heat generating cells 1 to a predetermined temperature (for example, 50° C. to 1500° C.) from the inner periphery side. As described above, the temperature of the heat generating cell 1 is adjusted predetermined temperature by the temperature adjustment unit T. Specifically, the output of the power supply 31 is controlled by the control unit 33, on the basis of the temperature detected by the temperature sensor 32, and thus, the temperature of each of the heat generating cells 1 is adjusted to an appropriate value.

As described above, in the heat generating device 20 using a batch method, each of the heat generating cells 1 generates the excess heat by the occlusion and the discharge of the hydrogen. The mechanism by which the heat generating cell 1 generates heat has been described above (refer to FIG. 4), and by supplying the hydrogen-based gas into the sealed container 21 from the hydrogen supply nozzle 23, the hydrogen molecule is adsorbed on the inner peripheral surface of the multilayer film 1B of each of the heat generating cells 1, the hydrogen molecule is dissociated into two hydrogen atoms, and the hydrogen atoms after dissociation penetrate into the multilayer film 1B. The hydrogen atoms permeate through the heterogeneous material interface 13 (refer to FIG. 3) by quantum diffusion, or permeate through the heterogeneous material interface 13 by diffusion. That is, the hydrogen is occluded in the heat generating cell 1. In a state where the on-off valve 27 provided in the hydrogen discharge nozzle 25 is opened, the sealed container 21 is vacuum-evacuated by driving the vacuum pump (not illustrated) connected to the hydrogen discharge nozzle 25, each of the heat generating cells 1 is heated by each of the heaters 2, the hydrogen atoms that have penetrated through the multilayer film 1B are returned to the inner peripheral surface of the multilayer film 1B and recombined, and thus, are discharged as the hydrogen molecule. That is, the hydrogen is discharged from the heat generating cell 1. In the process where the hydrogen atoms are returned to the inner peripheral surface of the multilayer film 1B, the hydrogen atoms permeate through the heterogeneous material interface 13 (refer to FIG. 3) by quantum diffusion, or the hydrogen atoms permeate through the heterogeneous material interface 13 by diffusion. Therefore, the heat generating cell 1 generates heat by occluding the hydrogen, and generates heat by discharging the hydrogen.

As described above, in the heat generating device 20, the hydrogen used for generating heat in each of the heat generating cells 1 by the occlusion and the discharge flows into the second space S2 in the sealed container 21, is returned to the suction side of the circulation pump 35 from the second space S2 through the recovery pipe 39 of the hydrogen recovery line L2, is pressurized to a predetermined pressure by the circulation pump 35, and then, is sent to the supply pipe 34 of the hydrogen supply line L1, and then, is circulated through the same path, and is used for the heat generation of the plurality of heat generating cells 1 and the heat exchange with respect to the heat medium.

On the other hand, when the circulation pump 41 provided in the supply pipe 40 of the heat medium supply line L3 is driven, the heat medium continuously circulates a closed loop formed by the supply pipe 40, the heat utilization device 50, the recovery pipe 43, and the labyrinthine flow path 29 formed in the third space S3 of the heat generating device 20. That is, the heat medium introduced to the third space S3 of the sealed container 21 from the heat medium supply nozzle 26 through the recovery pipe 43 is heated by the heat exchange with respect to the plurality of heat generating cells 1 in the process of flowing through the labyrinthine flow path 29 of the third space S3, and thus, the heat generated in the plurality of heat generating cells 1 is efficiently recovered.

As described above, the heat medium that has recovered the heat generated in the plurality of heat generating cells 1 is discharged to the supply pipe 40 from the heat medium discharge nozzle 24, is supplied to the heat utilization device 50 through the circulation pump 41 and the flow rate control valve 42 provided in the supply pipe 40, and supplies the recovered heat to the heat utilization device 50. Then, the heat utilization device 50 is driven by using the heat supplied from the heat medium as a heat source to perform required work such as power generation. The heat medium of which the temperature is decreased by being used for driving the heat utilization device 50 is discharged to the recovery pipe 43 from the heat utilization device 50, is introduced to the third space S3 of the heat generating device 20 from the heat medium supply nozzle 26 through the recovery pipe 43, and then, repeats the same operation, recovers the heat generated in the plurality of heat generating cells 1, and continuously supplies the heat to the heat utilization device 50.

In the heat generating device 20, the hydrogen used for generating heat in the heat generating cell 1 by the occlusion and the discharge is discharged from the second space S2 of the sealed container 21, is returned to the hydrogen supply line L1 through the hydrogen recovery line L2, is supplied again to the first space S1 of the sealed container 21, and is used for the heat generation of the heat generating cell 1 and the heat exchange of the heat generated in the heat generating cell 1 with respect to the heat medium, and then, the same operation is repeated.

According to the heat utilization system 30 that is operated as described above, the heat generated in the heat generating high output, which also functions as the shell and tube type heat exchanger, is efficiently recovered by the heat medium, and thus, an effect that the heat utilization device 50 can be driven by effectively utilizing the heat recovered by the heat medium can be obtained.

The heat utilization system 30 including the heat generating device 20 using a batch method according to the first embodiment illustrated in FIG. 7, has been described above, but even when the heat utilization system according to the invention is configured by including the heat generating device 20A using a batch method according to the second embodiment illustrated in FIG. 14 or the heat generating device 20B using a permeation method according to the third embodiment illustrated in FIG. 15, the same effect as described above can be obtained.

The application of the invention is not limited to the embodiments described above, and it is obvious that various modifications can be made within the scope of the technical idea described in the claims, the specification, and the drawings.

REFERENCE SIGN LIST

1, 60, 70: heat generating cell
1A, 60A, 70A: support
1B, 60B, 70B: multilayer film
2: heater
20, 20A, 20B: heat generating device
21: sealed container
22: separator
28: baffle plate
29: flow path
30: heat utilization system
50: heat utilization device
L1: hydrogen supply line
L2: hydrogen recovery line
L3: heat medium supply line
L4: heat medium recovery line
S1: first space
S2: second space
S3: third space

The invention claimed is:

1. A heat generating device, comprising:

a plurality of heat generating cells, each of the plurality of heat generating cells comprising:

a support having tubular shape; and a multilayer film formed on an inner peripheral surface of the support for generating heat by occlusion and discharge of hydrogen;

a sealed container;

a plurality of separators dividing an inside of the sealed container into a first space, a second space, and a third space in an axial direction of the sealed container, the first space and the second space being located at both ends in the axial direction in the sealed container; and a heater for heating each of the plurality of heat generating cells, wherein the plurality of heat generating cells penetrate through the plurality of separators, and both ends of each of the plurality of heat generating cells in an axial direction are respectively opened to the first space and the second space such that hydrogen passes through an inside of each of the plurality of heat generating cells from the first space to the second space.

2. The heat generating device according to claim 1, wherein each of the plurality of heat generating cells has a hollow space therein, and the heater includes a heating wire, and the heating wire is provided in the hollow space of each of the plurality of heat generating cells.

3. The heat generating device according to claim 1, wherein the heater includes a heating wire, and the heating wire is wound around an outer periphery of the support of the heat generating cell.

4. The heat generating device according to claim 1, wherein in the third space, a labyrinthine flow path is formed by a plurality of baffle plates.

5. A heat utilization system, comprising:

the heat generating device according to claim 1;

a hydrogen supply line for supplying hydrogen to the first space of the heat generating device;

a hydrogen recovery line for recovering hydrogen discharged from the second space of the heat generating device and returning the hydrogen to the hydrogen supply line;

a heat utilization device for utilizing heat generated in the heat generating device;

a heat medium supply line for supplying a heat medium discharged from the third space of the heat generating device to the heat utilization device; and a heat medium recovery line for recovering a heat medium discharged from the heat utilization device and returning the heat medium to the third space of the heat generating device.

6. The heat generating device according to claim 1, wherein the multilayer film includes a first layer formed of a hydrogen storage metal or a hydrogen storage alloy, and a second layer formed of a hydrogen storage metal or a hydrogen storage alloy, which is different from that of the first layer, or ceramics, and the first layer is made of any one of Ni, Pd, Cu, Mn, Cr, Fe, Mg, Co, and an alloy thereof, and the second layer is made of any one of Ni, Pd, Cu, Mn, Cr, Fe, Mg, Co, and an alloy thereof, or SiC.

* * * * *